United States Patent
Hadimioglu et al.

(10) Patent No.: US 11,898,993 B2
(45) Date of Patent: Feb. 13, 2024

(54) FLUID IMPERMEABLE ULTRASONIC TRANSDUCER

(71) Applicant: Labcyte Inc., San Jose, CA (US)

(72) Inventors: Babur Hadimioglu, Mountain View, CA (US); Jay Daulton, Gilroy, CA (US); Richard N. Ellson, Palo Alto, CA (US)

(73) Assignee: Labcyte, Inc., San Jose, CA (US)

( * ) Notice: Subject to any disclaimer, the term of this patent is extended or adjusted under 35 U.S.C. 154(b) by 1243 days.

(21) Appl. No.: 16/369,780

(22) Filed: Mar. 29, 2019

(65) Prior Publication Data

US 2019/0302063 A1  Oct. 3, 2019

Related U.S. Application Data

(60) Provisional application No. 62/650,919, filed on Mar. 30, 2018.

(51) Int. Cl.
| | |
|---|---|
| *G01N 29/32* | (2006.01) |
| *G01N 29/24* | (2006.01) |
| *G01N 29/28* | (2006.01) |
| *H04R 23/00* | (2006.01) |
| *H04R 31/00* | (2006.01) |

(Continued)

(52) U.S. Cl.
CPC ............ *G01N 29/32* (2013.01); *B06B 1/067* (2013.01); *B06B 1/0685* (2013.01); *G01N 29/2437* (2013.01); *G01N 29/2456* (2013.01); *G01N 29/28* (2013.01); *G10K 11/02* (2013.01); *G10K 11/30* (2013.01); *H04R 23/00* (2013.01); *H04R 31/00* (2013.01)

(58) Field of Classification Search
CPC ............ G01N 29/32; G01N 29/2437; G01N 29/2456; G01N 29/28; B06B 1/067; B06B 1/0685; G10K 11/02; G10K 11/30; H04R 23/00; H04R 31/00
See application file for complete search history.

(56) References Cited

U.S. PATENT DOCUMENTS

| | | | |
|---|---|---|---|
| 3,989,965 A * | 11/1976 | Smith | B06B 1/0681 367/176 |
| 4,308,547 A | 12/1981 | Lovelady | |

(Continued)

FOREIGN PATENT DOCUMENTS

| | | |
|---|---|---|
| AU | 2008233201 A1 | 10/2008 |
| CA | 2127039 A1 | 3/1996 |

(Continued)

OTHER PUBLICATIONS

"Influence of acoustic impedance of multilayer acoustic systems on the transfer function of ultrasonic airborne transducers" by Gudra et al. (Year: 2002).*

(Continued)

*Primary Examiner* — Xin Y Zhong
(74) *Attorney, Agent, or Firm* — Kilpatrick Townsend & Stockton LLP

(57) ABSTRACT

A fluid impermeable transducer includes an assembly of a transducer head and a casing, and an actuator disposed in the casing rearward of the back of the transducer head and operable to transmit acoustic energy through the transducer head. The transducer head and casing define a working portion of the transducer that is fluid impermeable.

59 Claims, 16 Drawing Sheets

(51) Int. Cl.
  *B06B 1/06* (2006.01)
  *G10K 11/30* (2006.01)
  *G10K 11/02* (2006.01)

(56) References Cited

U.S. PATENT DOCUMENTS

| | | | |
|---|---|---|---|
| 4,945,276 | A | 7/1990 | Mylvaganam et al. |
| 5,041,849 | A | 8/1991 | Quate |
| 5,295,120 | A | 3/1994 | Mcshane |
| 5,605,154 | A | 2/1997 | Ries et al. |
| 5,741,971 | A * | 4/1998 | Lacy .................. G01N 29/32 73/152.16 |
| 6,049,159 | A | 4/2000 | Barthe et al. |
| 6,416,164 | B1 | 7/2002 | Stearns |
| 6,492,762 | B1 | 12/2002 | Pant et al. |
| 6,588,278 | B1 * | 7/2003 | Takishita ........... G01N 29/0645 73/620 |
| 8,544,976 | B2 | 10/2013 | Ellson |
| 2004/0113524 | A1 | 6/2004 | Baumgartner et al. |
| 2007/0055183 | A1 * | 3/2007 | Kaminski ............ B06B 1/0677 601/2 |
| 2007/0167764 | A1 | 7/2007 | Hynynen |
| 2007/0167813 | A1 | 7/2007 | Lee et al. |
| 2011/0181149 | A1 | 7/2011 | Shikata |
| 2013/0289593 | A1 | 10/2013 | Hall et al. |
| 2014/0096610 | A1 | 4/2014 | Ha et al. |
| 2016/0187298 | A1 | 6/2016 | Ko |
| 2019/0200959 | A1 * | 7/2019 | Chaggares ........... A61B 8/4488 |
| 2020/0346044 | A1 * | 11/2020 | Woodacre ............. A61N 7/02 |

FOREIGN PATENT DOCUMENTS

| | | |
|---|---|---|
| CN | 2850721 | 12/2006 |
| CN | 101524682 A | 9/2009 |
| CN | 101652102 A | 2/2010 |
| CN | 105726059 A | 7/2016 |
| JP | 5049595 A | 5/1975 |
| JP | 05236597 | 9/1993 |
| JP | 2011152303 | 8/2011 |
| JP | 5049595 | 10/2012 |
| WO | 0104969 | 1/2001 |

OTHER PUBLICATIONS

CN 201980035708.1; First Office Action; dated May 26, 2021; 24 pages, including translation.
Duan Zongwen et al.; *Clinical Ultrasound Medicine*, first edition; Jun. 30, 2017; Scientific and Technological Documentation Press, pp. 22-23.
Commission for Compiling and Examining In-Service Training Materials for Railway Workers; *Railway Flaw Detecting Workers*; Sep. 30, 2014; China Railway Publishing House; p. 94.
AU2019245278; First Examination Report; dated Mar. 5, 2021; 4 pages.
V. M. Ristic, "Principles of Acoustic Devices," John Wiley and Sons (1983), pp. 128-159 and 316-335.
G. Crowe, "An Introduction to Nondestructive Testing," (2009), pp. 25-30.
https://www.ndt.org/, accessed Jun. 18, 2019, 8 pages.
https://asnt.org/Home, accessed Jun. 18, 2019, 2 pages.
AU2019245278 , "Fourth Examination Report", dated Feb. 28, 2022, 5 pages.
IN202047043330 , "First Examination Report", dated Oct. 11, 2021, 6 pages.
Application No. KR10-2020-7031299 , Office Action, dated Apr. 20, 2022, 13 pages.
AU2019245278 , "Third Examination Report", dated Feb. 1, 2022, 4 pages.
Application No. CN201980035708.1 , Office Action, dated Jan. 13, 2022, 24 pages.
Application No. JP2020-552296 , Office Action, dated Dec. 2, 2021, 14 pages.
PCT/US2019/024837 , "Notification Concerning Availability of the Publication of the International Application", dated Nov. 7, 2019, 1 page.
PCT/US2019/024837 , "International Search Report and Written Opinion", dated Oct. 14, 2019, 18 pages.
PCT/US2019/024837 , "Invitation to Pay Additional Fees and, Where Applicable, Protest Fee", dated Aug. 23, 2019, 14 pages.
Application No. EP19717093.9 , Office Action, dated Nov. 10, 2020, 3 pages.
Application No. PCT/US2019/024837 , International Preliminary Report on Patentability, dated Oct. 15, 2020, 13 pages.
AU2019245278 , "Second Examination Report", dated Aug. 19, 2021, 4 pages.
CA3,095,144 , Office Action, dated Nov. 4, 2021, 3 pages.
Application No. CA3, 095, 144 , Office Action, dated Aug. 18, 2022, 3 pages.
Application No. CN201980035708.1 , Office Action, dated Aug. 17, 2022, 13 pages.
Application No. CN201980035708.1 , Office Action, dated May 18, 2022, 15 pages.
Application No. EP 19717093.9 , Office Action, dated Sep. 14, 2022, 8 pages.
Application No. JP2020-552296 , Office Action, dated Jul. 7, 2022, 9 pages.
Application No. AU2019245278 , "Fifth Examination Report", dated Feb. 14, 2023, 6 pages.
Application No. JP2020-552296 , Notice of Allowance, dated Feb. 15, 2023, 3 pages.
Application No. KR10-2020-7031299 , Office Action, dated Oct. 27, 2022, 5 pages.
Application No. KR10-2020-7031299 , Office Action, dated Feb. 15, 2023, 8 pages.
AU2022201498 , "First Examination Report", dated May 2, 2023, 6 pages.
CA3,095,144 , Office Action, dated May 4, 2023, 4 pages.

* cited by examiner

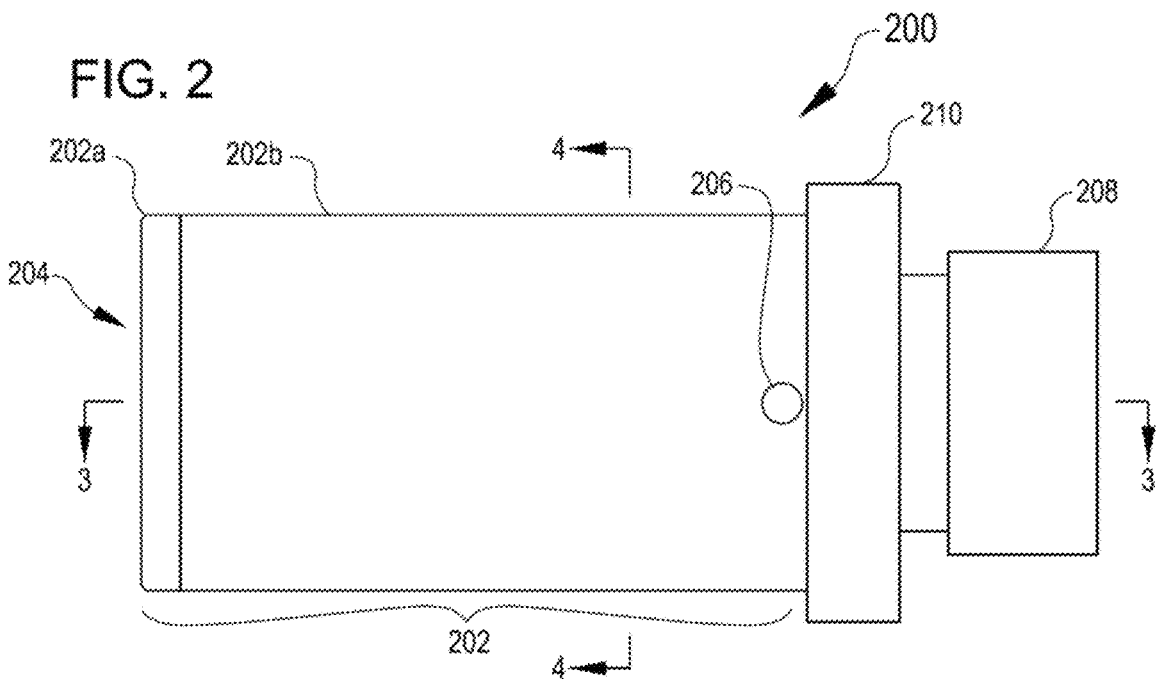
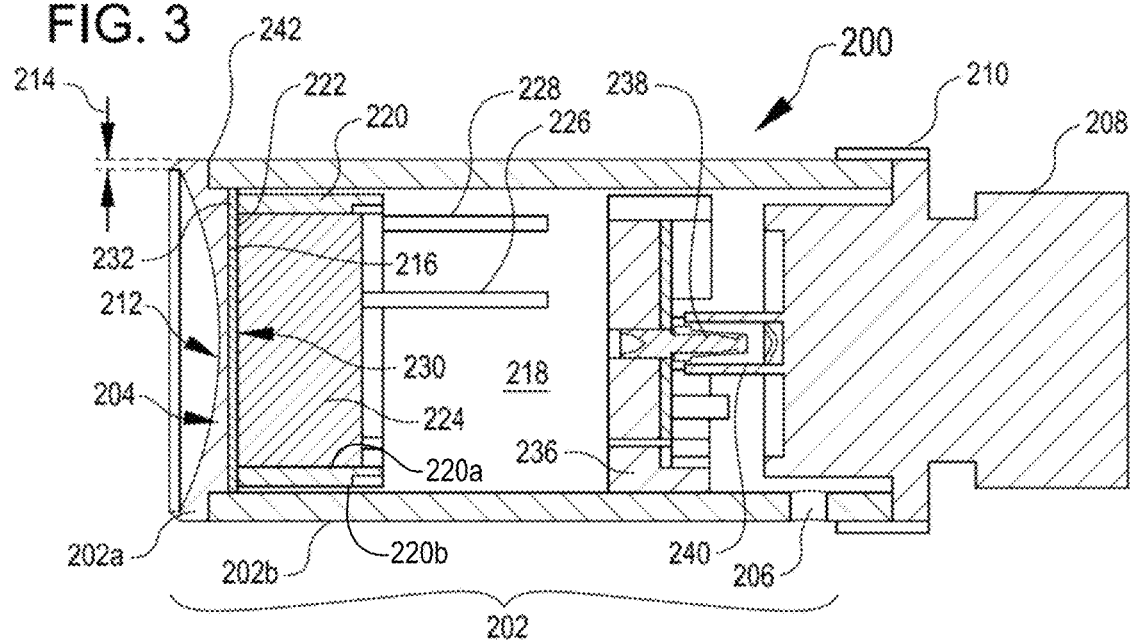

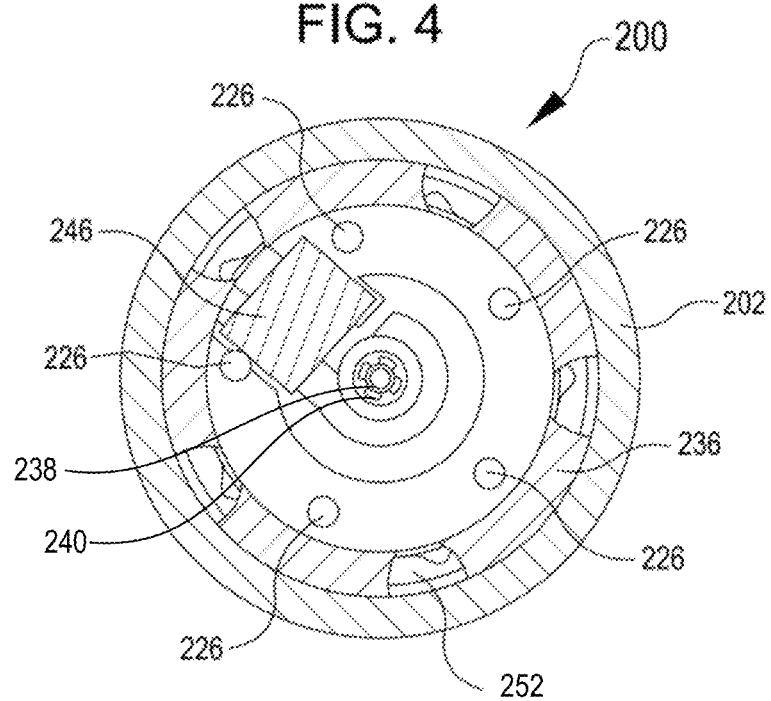

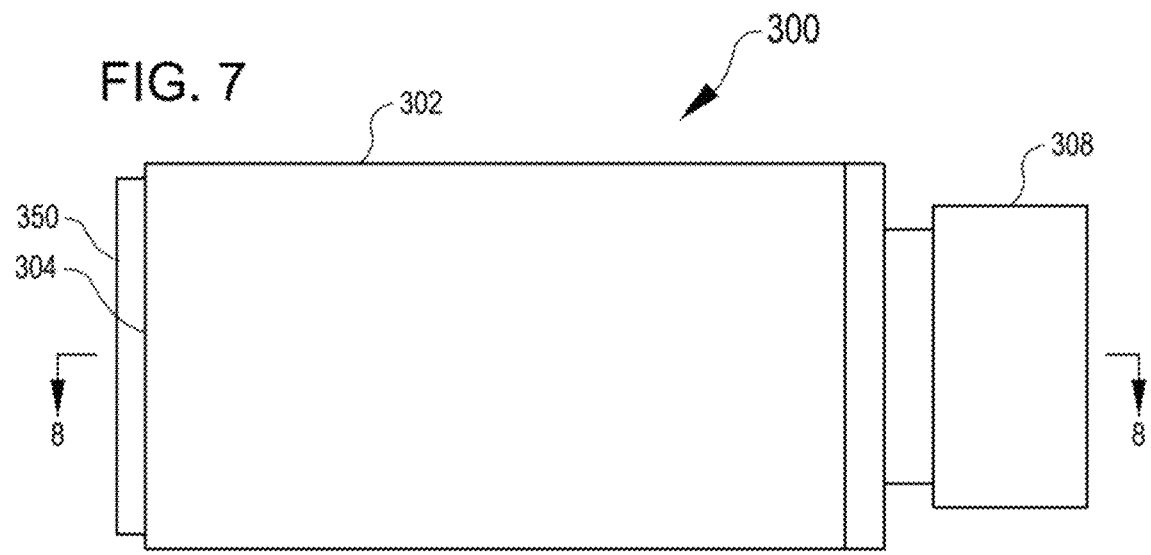
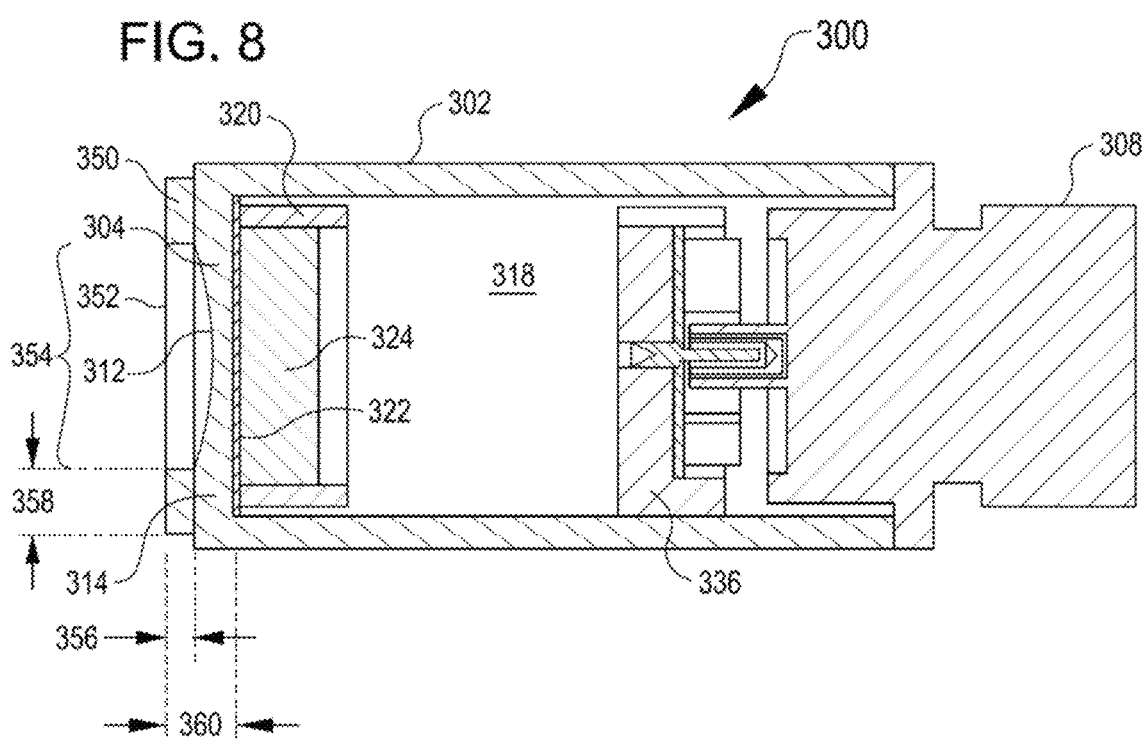

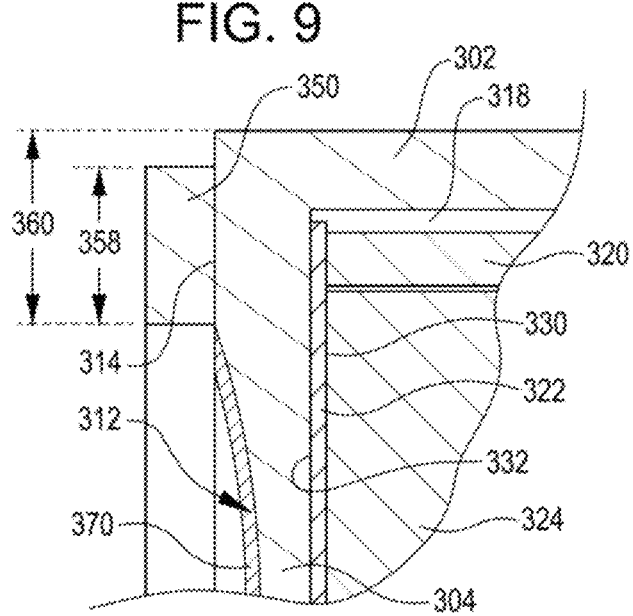

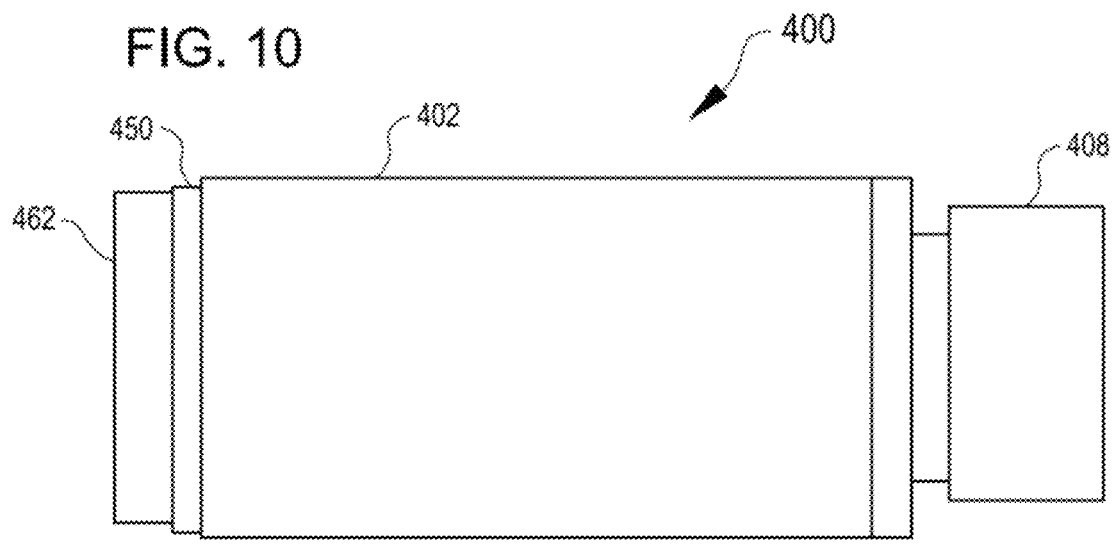
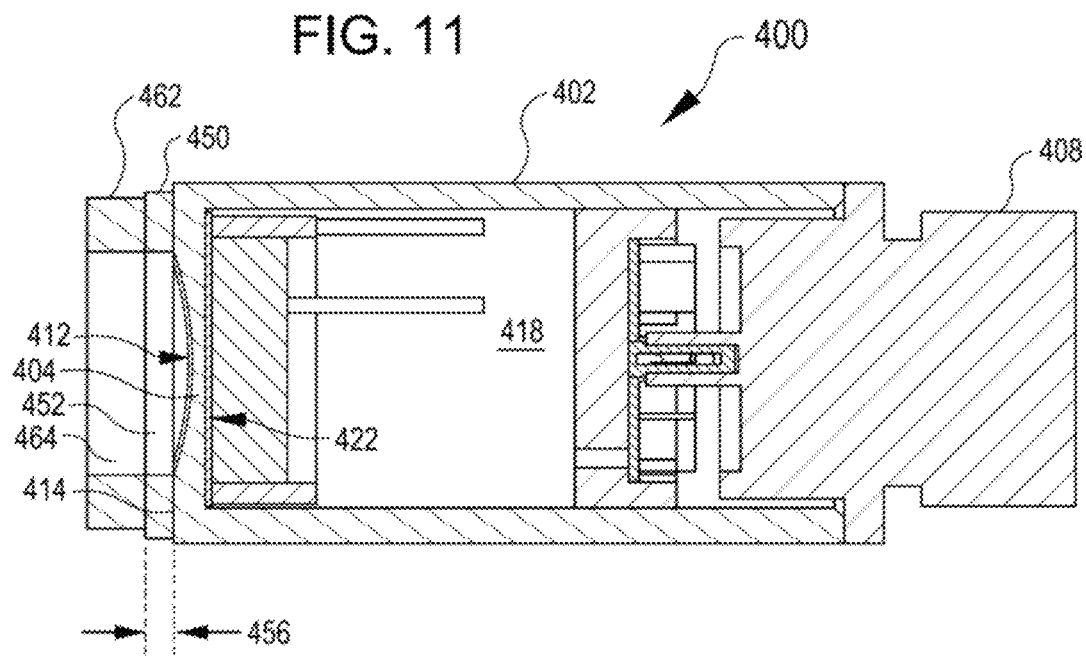

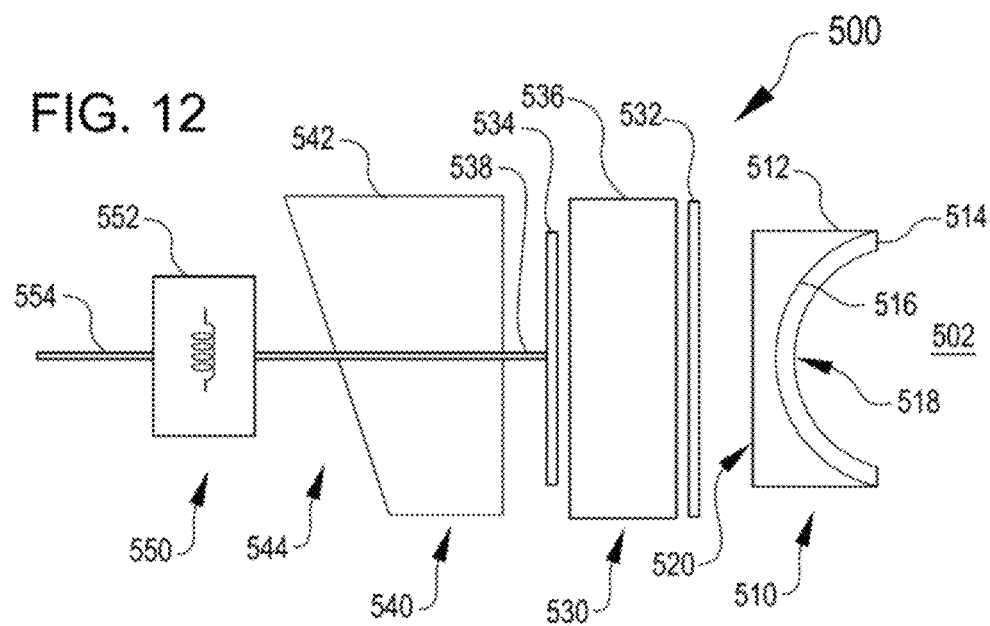
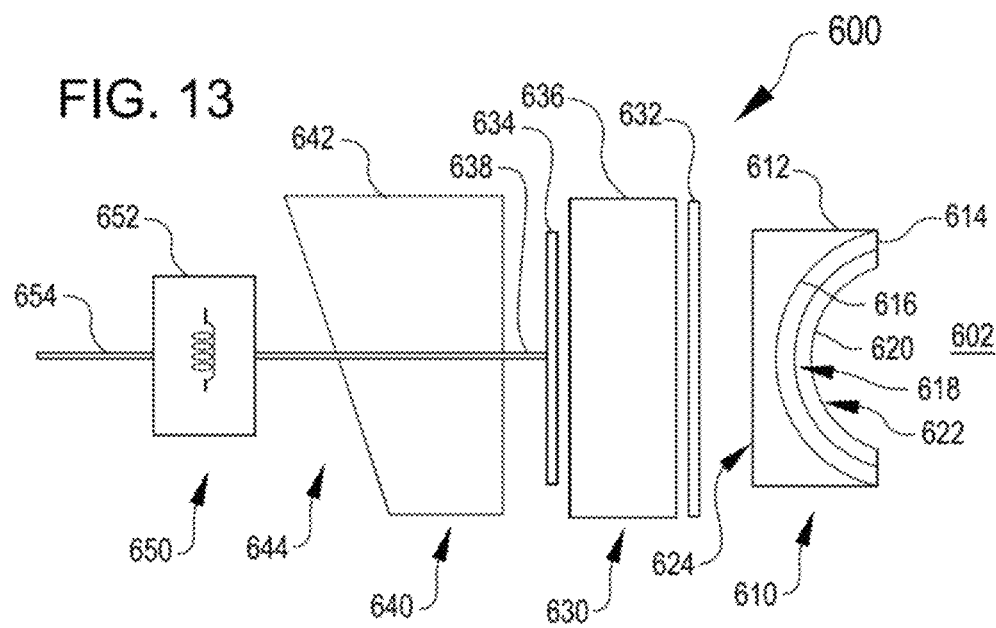

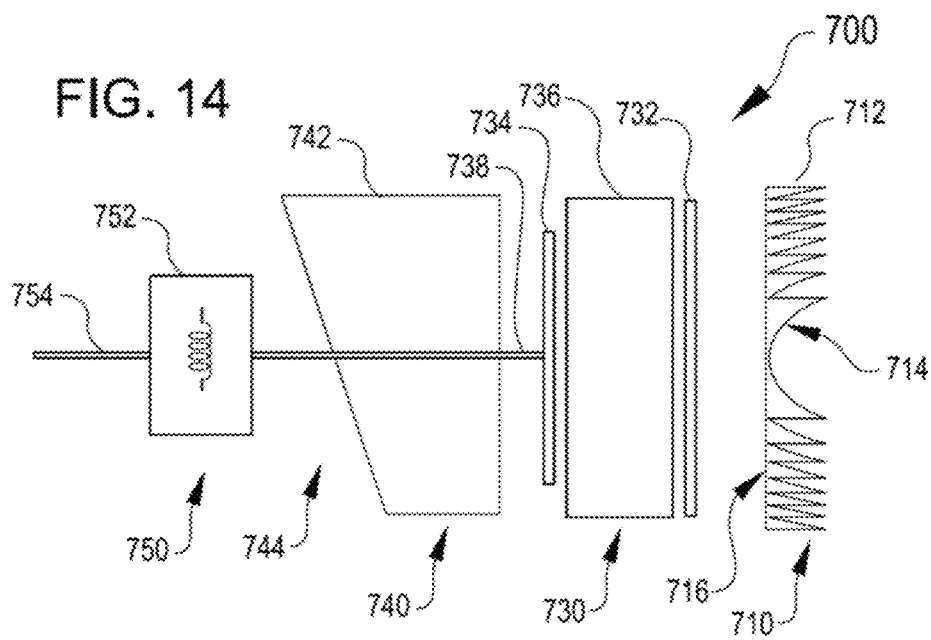

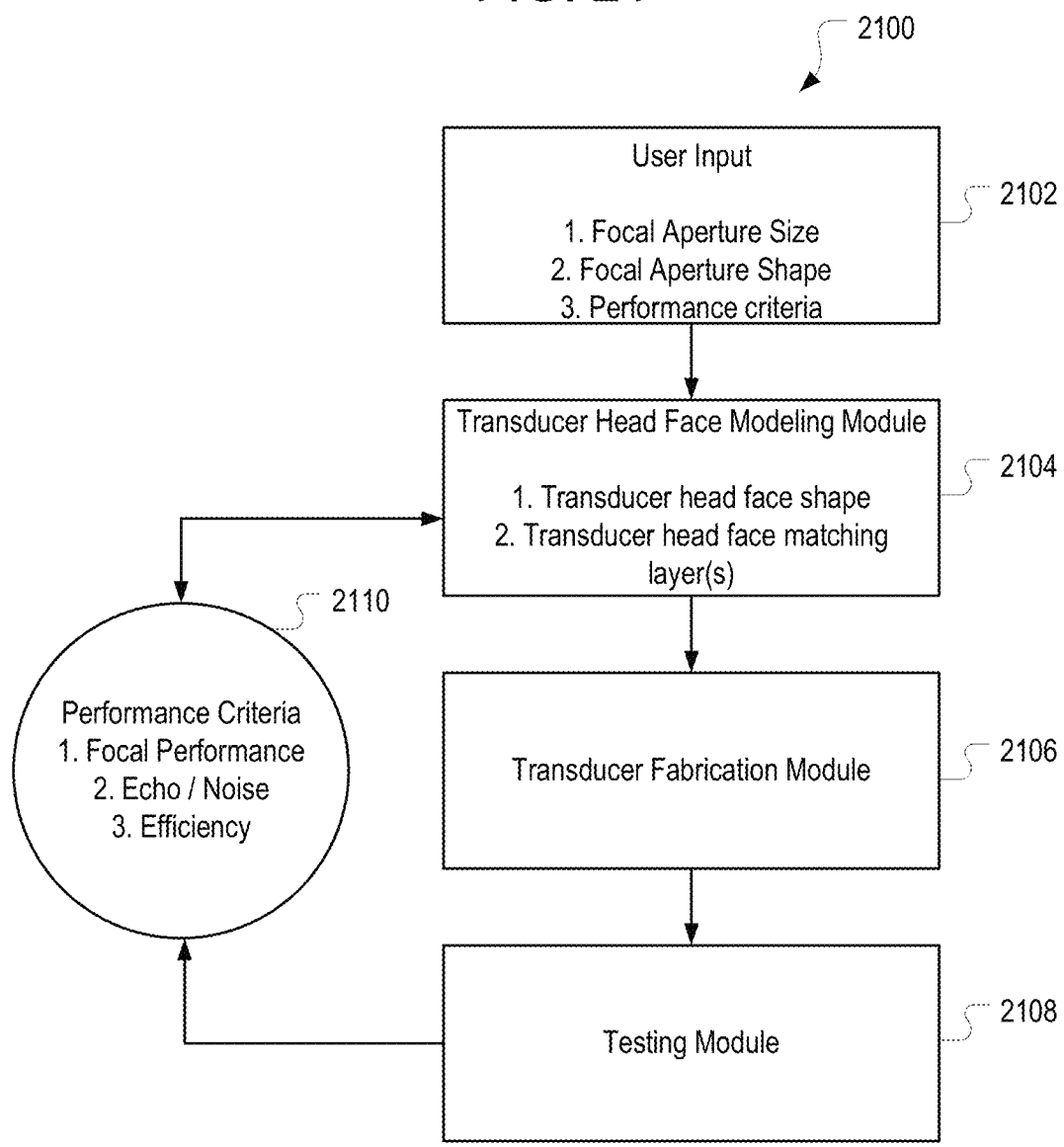

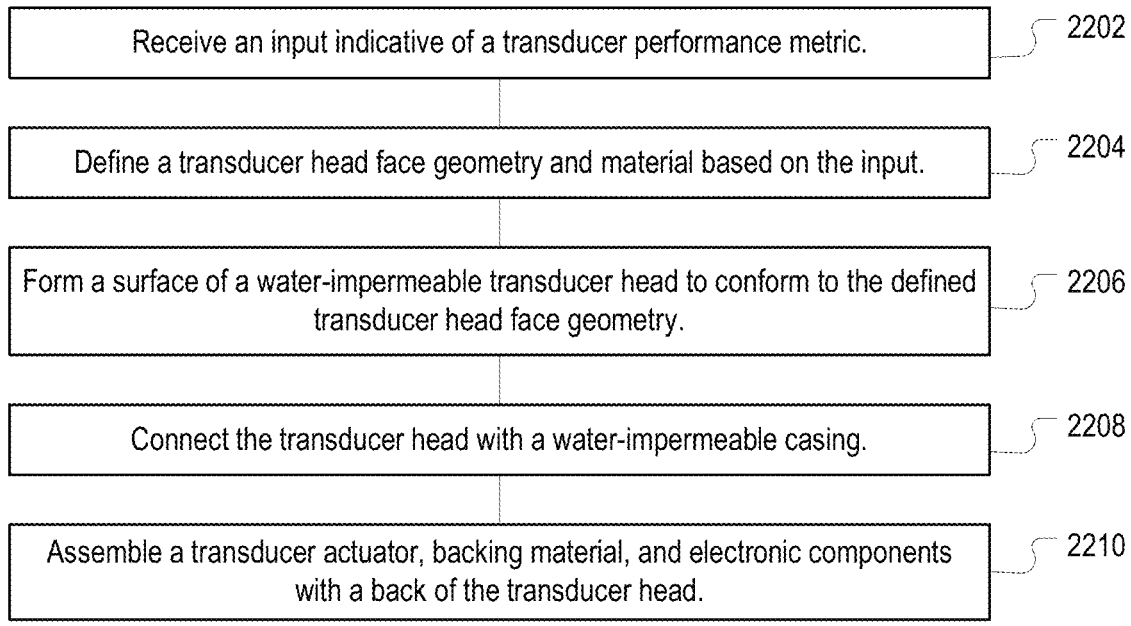
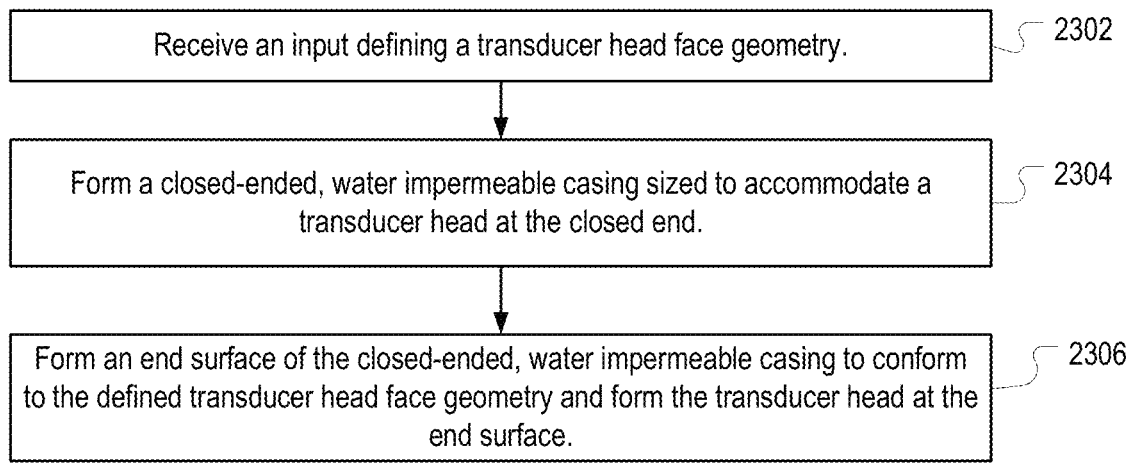

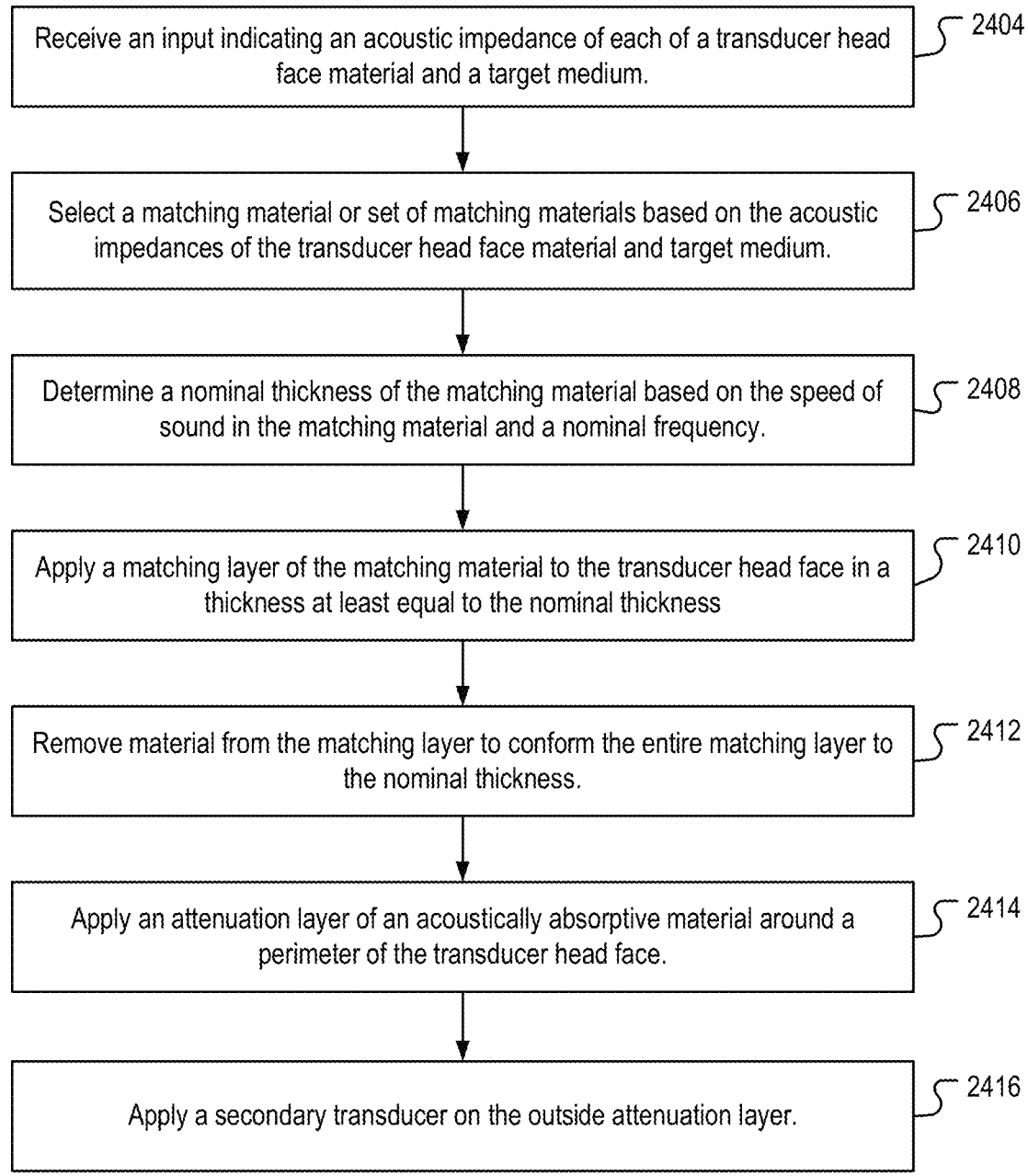

Focal Sweep

Echo Amplitude vs Pin X-Y Position

FLUID IMPERMEABLE ULTRASONIC TRANSDUCER

CROSS-REFERENCES TO RELATED APPLICATIONS

This application claims priority under 35 U.S.C. § 119(e) to U.S. Provisional Application No. 62/650,919 filed on Mar. 30, 2018, the entire contents of which are herein incorporated by reference for all purposes.

BACKGROUND

Ultrasonic transducers are used for a wide variety of applications, such as in medical imaging, for procedures in which ultrasonic energy is applied to heat or disrupt tissue within an organism, and in processes for the ejection of fluid droplets. Any or all of the above cases can require that an ultrasonic transducer be capable of focusing the acoustic energy to a small focal point. By way of example, some methods of producing fluid droplets using acoustic means include those described in U.S. Pat. No. 8,544,976 to Ellson, and in U.S. Pat. No. 6,416,164 to Stearns et al., both of which are hereby incorporated by reference for all purposes.

Ultrasonic acoustic radiation may be focused by a variety of means. For example, a curved surface may be used to direct or divert acoustic radiation to a focal point. For processes that produce fluid droplets, the focal point may be placed near a fluid surface. One such technique is described in U.S. Pat. No. 4,308,547 to Lovelady et al. Some commercially available acoustic transducers focus acoustic energy by way of a curved surface, including some focused immersion transducers manufactured by Camasonics (Wiltshire, UK), GE/Krautkramer, Sonic Concepts, Inc., (Bothell, Washington, USA), and Sonotec (Halle, Germany), Ultran Group (State College, PA, USA). Other methods of focusing acoustic energy include the use of Fresnel lenses, as described in, e.g., U.S. Pat. No. 5,041,849 to Quate et al. Various generic curved-surface and spherical-surface transducers are used for the non-destructive test (NDT) industry, medical industry, and the like. "Immersion" as used herein, indicates not only the conventional definition of immersion for NDT, (in which the transducer is partially or fully immersed in a liquid coupling fluid) but can be used in a more general sense to include applications where any portion of the transducer is exposed to liquid, i.e., where a portion of a transducer is in coupling contact with a fluid.

An ultrasonic transducer typically includes an actuator and a focusing element that concentrates acoustic energy produced by the actuator. Some examples of actuators include piezoelectric and magnetostrictive elements. In operation, the actuator is driven by a signal at an ultrasonic driving frequency and produces ultrasonic vibrations in the active physical element. These vibrations are emitted into a surrounding medium, such as a liquid or gel (e.g., water), and from there to a structure or medium of interest. For example, in applications involving droplet ejection, acoustic energy can be transmitted in the form of ultrasonic vibrations from a transducer, through an acoustically conductive fluid or coupling fluid like water, and from there into a reservoir from which droplets are ejected. Transducers designed to primarily or predominantly focus acoustic energy while immersed in a liquid medium are generally referred to as immersion transducers.

A focusing immersion transducer employs a shaped active physical element that may include a curved face, for example, or that may employ a Fresnel lens or similar structure. In such cases, the face must be composed of a material that can be formed precisely to a focusing shape and that can readily transmit acoustic energy into the liquid medium. To this end, traditional focusing, immersion ultrasonic transducers employ a hard-set epoxy resin, ceramic, composite, or comparable material to form the focusing shape of the focusing lens. While such focusing lens materials can be formed by molding or another net-shape manufacturing method, and while generally waterproof up to a limited duration, it has been found that such materials are prone to degrade and, when exposed to water for a long duration, can tend to gradually take up water, leading to deformation, a shift in acoustic properties and ultimately to failure of the transducer. While such transducers may be suitable for short-term immersion applications, greater precision and durability are needed for applications that require long-term immersion. Typical immersion transducers, such as those used for conventional NDT procedures, have a relatively low duty cycle in liquid compared to droplet-ejecting transducers, and do not need to have a constant focal length over time. However, for acoustic droplet ejection applications, device performance is much more reliant on consistency of focus, particularly consistency over long immersion times. Hence, it is desirable to have a collection of transducers that perform within a narrow range of focusing behavior and remain within that narrow range despite the transducer being immersed for long periods of time.

BRIEF SUMMARY

Embodiments herein described include a transducer including an assembly of a transducer head and a casing, the transducer head having a focusing lens facing in a forward direction and a back of the transducer head facing in a rearward direction. The casing is connected with the transducer head and extends in the rearward direction, with an actuator disposed in the casing rearward of the back of the transducer head and operable to transmit acoustic energy in the forward direction through the transducer head. Fluid impermeability, as described herein, may be applied to portions of the transducer that are unavoidably immersed in a working fluid when the transducer is used. For example, according to various embodiments the transducer head and casing can define a working portion of the transducer that is fluid impermeable. Fluid impermeable can include, e.g., impermeable to water or similarly viscous reactive and non-reactive solvents, or impermeable to penetration by common liquids and/or solvent systems including non-polar, polar protic and polar aprotic solvents and, in particular, water/aqueous-solutions (including salt water), DMSO, alcohols, alkanes, oils, surfactants and the like. In some embodiments, fluid impermeable also includes impermeable to vapor, e.g. solvent vapor, water vapor, air, or other comparable gas, at both conventional operating conditions and at elevated temperatures/pressures such as those used during sterilization procedures.

According to various embodiments, the casing and transducer head are formed of one or more fluid-impermeable, non-absorbing solid materials, e.g. a metallic element, metal alloy, ceramic or comparable material. Either or both of the transducer head and casing can be formed of any suitable water-impermeable material with appropriate acoustic performance. The material (if a single part) or the assembly (if multiple parts) preferably provides hermiticity and fluid (including but not limited to water) impermeability, and the transducer head preferably has an acoustic impedance that isn't excessive, i.e., that does not cause high acoustic losses and/or increased "ringing," as discussed below. Suitable materials may include, e.g., aluminum, beryllium, cadmium, germanium, lead, silver, tin, titanium, zinc, zirconium, alloys of any of the above, or composites containing any of the above materials with or without sealants, dopants, or comparable means for mitigating corrosion, toxicity, or structural weaknesses. The material selection for the transducer head (or lens) contrasts with conventional epoxy lenses not only in fluid impermeability, but also in being relatively homogenous in mechanical properties. The transducer head (or lens) therefore remains mechanically homogenous when immersed, resulting in good beam symmetry that persists over the lifetime of the transducer.

The casing and transducer head are preferably joined in a manner that produces a water-impermeable and non-absorbing joint, e.g. welded or brazed together, formed of a common part, or otherwise permanently and water-impermeably joined. The transducer head is preferably formed of a material capable of transmitting reproducible sound velocity for high precision applications, therefore a material having a high acoustic velocity is preferred. Alternatively, some portions of the casing and transducer head can be made of multiple materials, such as ceramics or plastics combined with metals, provided the assembly does not impact long-term hermiticity. For example, a plastic or ceramic sleeve could be placed around a metal casing, or metal could be plated either inside or outside, or both inside and outside, of an assembly containing the transducer head and/or transducer head components.

According to various embodiments, the casing and transducer head can be formed of a continuous element that defines the working portion, with the focusing lens formed directly on the transducer head portion of the continuous element, and the actuator positioned in the casing behind the focusing lens.

According to some embodiments, the focusing lens is formed of a concave portion of the transducer head configured to focus acoustic energy. This concave portion can be formed of a spherical acoustic lens, a cylindrical acoustic lens, or other suitable acoustic focusing shape. In some embodiments, the focusing lens can include a diffractive acoustic lens configured to focus acoustic energy. A peripheral portion circumscribing the focusing lens can define a transducer head rim, and in some embodiments, an attenuation layer is positioned on the transducer head rim, wherein the attenuation layer is operable to absorb acoustic energy. In some embodiments, an auxiliary transducer can be positioned on the attenuation layer and separated from the transducer by the attenuation layer.

The transducer head can further include a matching layer disposed on the focusing lens for reducing loss in an acoustic signal transmitted from the focusing lens through the matching layer into a medium. Thus, the matching layer can be selected based in part on the acoustic properties of the medium with which the transducer is intended to function. Typical acoustic media include water, aqueous solutions, or other fluids with viscosity similar to water, as well as various low-acoustic-loss gels such as, but not limited to, water/propylene glycol-based gel couplants like SONOGLIDE (Sonotech, Inc., Bellingham WA) or SONOGEL (Sonogel Vertriebs GmbH, Bad Camberg, Germany), or solid, dry couplants like AQUALENE (Canadian Patent Application CA2127039 A1). The matching layer has an acoustic impedance between the acoustic impedances of the transducer head and the medium, typically close to the matching value as defined below with reference to Equation 1. The matching layer has a thickness corresponding to an odd multiple of a quarter wavelength of an acoustic signal at a nominal frequency passing through the matching layer.

Embodiments herein described also include methods of forming a fluid impermeable transducer. For example, according to various embodiments, a fluid impermeable transducer can be made by forming a substantially hollow casing from a fluid impermeable material having an internal cavity and an open first end, removing material from a head element formed of the fluid impermeable material to form a focusing lens on the head element, and joining the head element with the first end of the casing to form a fluid impermeable joint. The head element is positioned such that the focusing lens points away from the casing, and an actuator can be inserted in the casing adjacent the transducer head. An attenuation layer can be applied to a periphery of the head element adjacent to the focusing lens.

Methods of forming a fluid impermeable transducer can also include: forming a substantially hollow casing from a fluid impermeable material having an internal cavity and a closed first end defining a transducer head; removing material from an outer surface of the closed first end to form a focusing lens on the closed first end; and inserting an actuator in the casing adjacent the transducer head. The head element can include a concave acoustic lens formed in the head element via a precision machining process, and a matching layer can be applied to the focusing lens, the matching layer having a matching acoustic impedance that is less than a first acoustic impedance of the transducer head.

Embodiments herein described also include methods of ejecting droplets from a reservoir of fluid using a fluid impermeable transducer according to any of the embodiments of fluid impermeable transducers described herein. Specifically, such embodiments include immersing the focusing lens of the fluid impermeable transducer in an acoustic medium or coupling medium positioned to couple acoustic energy from the transducer to a reservoir continuing a fluid for droplet ejection. In some embodiments, the fluid reservoir and the acoustic medium can be the same fluid or can be a continuous reservoir. However, in general, the acoustic medium will be a fluid or gel medium positioned between the transducer and a reservoir, and the reservoir will contain a different fluid separated from the coupling medium. The transducer generates an acoustic pulse by the actuator at a frequency configured to cause droplet ejection from a fluid surface of the reservoir, and passes the acoustic pulse from the actuator to the fluid reservoir via the focusing lens and through the acoustic medium.

Embodiments herein described also include methods of performing non-destructive acoustic testing (NDT) of a structure with a fluid impermeable transducer according to any of the embodiments of fluid impermeable transducers described herein. Specifically, such embodiments include immersing the focusing lens of the fluid impermeable transducer in an acoustic medium in fluid contact with the structure and generating an acoustic pulse by the actuator and directed at a scanned region of the structure. An echo of the acoustic pulse corresponding to the scanned region is received, either by the same transducer in a "listening" mode or by a second transducer, and a physical parameter of the scanned region of the structure based on a characteristic of the echo.

BRIEF DESCRIPTION OF THE DRAWINGS

Various embodiments in accordance with the present disclosure will be described with reference to the drawings, in which:

FIG. 2 shows a side view of a first fluid impermeable ultrasonic transducer, according to some embodiments of the present disclosure;

FIG. 3 shows a side section schematic of the fluid impermeable ultrasonic transducer of FIG. 2;

FIG. 4 shows an end section schematic of the fluid impermeable ultrasonic transducer of FIGS. 2-3;

FIG. 7 shows a side view of a second fluid impermeable ultrasonic transducer, according to some embodiments of the present disclosure;

FIG. 8 shows a side section schematic of the fluid impermeable ultrasonic transducer of FIG. 7;

FIG. 9 shows a side section schematic of the fluid impermeable ultrasonic transducer of FIGS. 7-8 with attention to the actuator and focusing lens;

FIG. 10 shows a side view of a third fluid impermeable ultrasonic transducer, according to some embodiments of the present disclosure;

FIG. 11 shows a side section schematic of the fluid impermeable ultrasonic transducer of FIG. 10;

FIG. 12 shows a simplified schematic diagram of the working components of an immersion transducer employing a matching layer, in accordance with some embodiments of the present disclosure;

FIG. 13 shows a simplified schematic diagram of the working components of an immersion transducer employing multiple matching layers, in accordance with some embodiments of the present disclosure;

FIG. 14 shows a simplified schematic diagram of the working components of an immersion transducer employing a diffractive focusing lens, in accordance with some embodiments of the present disclosure;

FIG. 21 shows an example system for generating a focusing lens for use in a fluid impermeable ultrasonic transducer, in accordance with embodiments;

FIG. 22 shows a first example process for producing a fluid impermeable ultrasonic transducer, in accordance with embodiments;

FIG. 23 shows a second example process for producing a fluid impermeable ultrasonic transducer, in accordance with embodiments;

FIG. 24 shows a third example process for producing a fluid impermeable ultrasonic transducer, in accordance with embodiments;

DETAILED DESCRIPTION

Figure 1:
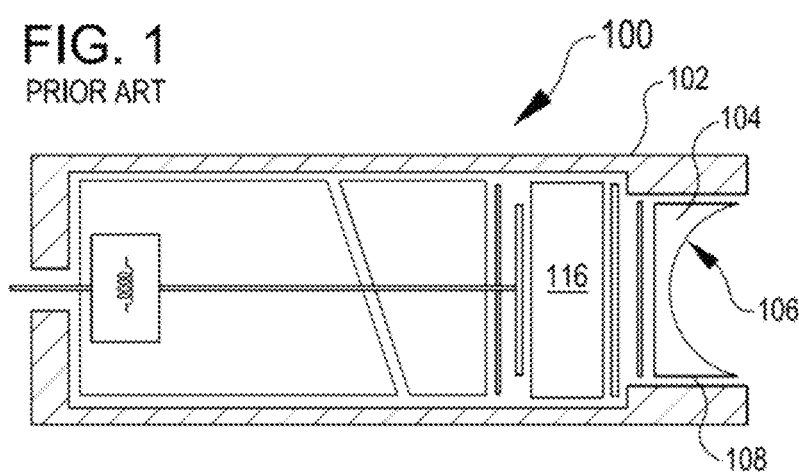
FIG. 1 shows a simplified side section schematic of a traditional, prior art ultrasonic transducer.

In the following description, various embodiments will be described. For purposes of explanation, specific configurations and details are set forth in order to provide a thorough understanding of the embodiments. However, it will also be apparent to one skilled in the art that the embodiments may be practiced in other configurations, or without the specific details. Furthermore, well-known features may be omitted or simplified in order not to obscure the embodiment being described.

Embodiments of ultrasonic transducers herein described include immersion ultrasonic transducers employing a fluid impermeable transducer head. Fluid impermeable ultrasonic transducers can further include a fluid impermeable shell, which may be an integral part forming both the shell and focusing lens, and also encompassing within it the actuator and related electrical components. In such cases, the fluid impermeable shell and the focusing lens can be formed of the same fluid impermeable part. The focusing lens can further include a matching layer thereon that improves transmission of acoustic energy from the focusing lens into a liquid medium.

According to some embodiments, an ultrasonic transducer case can include a fluid impermeable transducer head, including a focusing lens including focusing means thereon, which is permanently fixed to a fluid impermeable case, e.g. by welding, sintering, or comparably watertight attachment means. An actuator is disposed inside the case and adjacent to a back of the transducer head opposite the focusing lens, so that the actuator can drive vibrations into and through the transducer head when activated by a driving signal. The actuator can include, e.g., any suitable electromechanical actuator, such as but not limited to a piezoelectric actuator.

Fluid impermeable as described herein can include, e.g., impermeable to water or similarly viscous reactive and non-reactive solvents, or impermeable to penetration by common liquids and/or solvent systems including non-polar, polar protic and polar aprotic solvents and, in particular, water/aqueous-solutions (including salt water), DMSO, alcohols, alkanes, oils, surfactants and the like. In some embodiments, fluid impermeable also includes impermeable to vapor, e.g. solvent vapor, water vapor, air, or other comparable gas, at both conventional operating conditions and at elevated temperatures/pressures such as those used during sterilization procedures.

In some embodiments, fluid impermeable transducers as described herein remain fluid impermeable at a wide range of states beyond normal atmospheric conditions that might otherwise be assumed from the current disclosure. Fluid (including vapor) impermeability is desirable at both normal lab pressure and temperature, as well as elevated pressures and temperatures, as these are factors might otherwise drive penetrants into the transducer. For example, there is considerable utility in making the transducer easy to sterilize, and therefore at least some embodiments are impermeable to liquid and/or vapor under at least autoclave sterilization conditions (e.g., about 130° C. at more than 2, preferably more than 3 atmospheres), without inducing any detectable change in performance. Performance criteria for a transducer can include, but are not limited to, focal length, efficiency, acoustic beam shape or eccentricity, resilience against intrusion or other environmental factors, operational consistency over time, and/or signal-to-noise requirements. According to some embodiments, any connectors associated with the transducer, such as RF connectors or the like, can be sealed during exposure to extreme conditions within a cap; or can be designed for submersion in fluids at extreme pressures and elevated temperatures by use of standard high pressure/temperature hermetic RF connector design and laser welding techniques to join that connector to the transducer casing.

The focusing lens of the ultrasonic transducer can be shaped to focus acoustic energy. In some specific embodiments, the focusing lens can have a concave spherical, parabolic, cylindrical, or other focusing shape. The focusing lens can be shaped by molding, casting, precision machining, three-dimensional printing, flow forming, coating, etching or other suitable shaping or forming means or combinations thereof. According to some embodiments, the focusing lens further includes a matching layer thereon. A matching layer is formed of a thin layer of material having an acoustic impedance that falls between the acoustic impedances of the focusing lens and the liquid medium, and which is configured to transmit acoustic energy according to stepped transitions between the materials of the focusing lens, matching layer, and liquid medium in order to reduce overall transition losses.

The back of the transducer head can be joined to the actuator by an epoxy or alkoxysilane or other suitably robust, permanent adhesive, so that vibrations induced by the actuator are reliably transmitted into the transducer head and passed out of the focusing lens and into the adjacent material, typically the couplant to convey the acoustic energy towards it focal point.

According to some embodiments, the actuator can be sandwiched between the back of the transducer head and a backing material that aids in directing acoustic energy forward from actuator through the transducer head and into the liquid medium, and in absorbing acoustic energy that travels toward the back of the actuator layer, thus dampening reverberations in the actuator, reducing echo, and resulting in a cleaner signal. For example, in some embodiments, the backing material can include acoustic scattering materials such as copper, indium-lead, titanium dioxide, tungsten or combinations of these or similar materials. And, in some embodiments the acoustic absorbing materials in the backing material may be epoxy, polyurethane, silicone or combinations of similar material. Both scattering and absorbing materials may be present as particles and dispersed within a matrix of acoustic absorbing materials. The actuator may be joined to one or to both of the transducer head and the backing material by a thin layer of permanent adhesive, such as a thermoset epoxy resin or the like.

The backing layer, and particularly its uniformity, can impact the overall performance of the transducer. In particular, for backing layer compositions that include more than one component, the spatial distribution of components can be an important consideration. For example, for a backing layer that includes acoustic scattering materials suspended in an acoustic absorbing material where there is a significant difference in density between the two, care must be taken to preserve uniformity during fabrication to avoid settling as one of the components becomes more resistant to movement of the other, e.g., due to cross linking, cooling, gelling, polymerization or other processes that may occur during forming. Uniformity of backing layer materials can be achieved by various manufacturing methods. For example, buoyancy forces, which could lead to uneven distributions, can be mitigated by methods such as tumbling during fabrication when density differences within the backing layer materials are significant enough to create relative motion between components.

The actuator can be any suitable electromechanical actuator, such as a piezoelectric actuator. In specific embodiments, the actuator is a piezoelectric disk, such as but not limited to a thin ceramic piezoelectric element. Such elements include a thin piezoelectric ceramic element with an anode and cathode bonded thereto, with one of the anode and cathode being formed of a thin conductive disk covering the center and some or most of the disk surface are of one side of the ceramic element, and the other of the anode and cathode being formed of another thin conductive disk that wraps around the side of the actuator to the back side of the actuator disk Electrical connections to the anode and cathode are provided by a conductor ring made from an insulating material in the shape of a cylindrical ring that is positioned on the back side of the actuator. The conductor ring has electronically conductive traces, e.g. copper, coating the inner and outer surfaces. The conductor ring is positioned on or about the edge of the ceramic element and is electrically connected with the anode and cathode conductive disks by any suitable method, e.g. conductive epoxy, soldering, or comparable method. Thus, when the anode and cathode are supplied via the conductor ring with an electrical driving signal, such as a short impulse or tone-burst waveform, the ceramic element acts as a diaphragm and vibrates according to the driving signal. Suitable piezoelectric ceramic elements include, but are not limited to, barium titanate, polyvinylidene difluoride, lead zirconate titanate compositions, lithium niobate, zinc oxide, aluminum nitride and comparable materials.

Specific embodiments are described in detail below, with reference to the figures.

FIG. 1 shows a simplified side section schematic of a traditional ultrasonic transducer 100, which includes a case 102 and a transducer head 104 that is inserted into the case adjacent an actuator 116. The transducer head 104 may be formed of, e.g., a molded epoxy resin, silicone, or other comparable material. The transducer head 104 has an interface 108 between the transducer head and the case 102, wherein the transducer head is theoretically sized to prevent liquid intrusion between the transducer head and case; however, over time the transducer head 104 can absorb liquid and degrade, or can deform such that liquid can pass through the interface. Such absorption or degradation can ultimately permit liquid intrusion to the actuator 116, or may cause delamination of the transducer head 104 from the actuator. Deformation of the transducer head 104 manifests in drift in focal length over time, or drift in beam pattern produced by the transducer head. Similarly, delamination can result in a significant loss over time of power efficiency and/or uniformity of the acoustic transmission from the actuator 116 to the transducer head 104.

In contrast to the traditional ultrasonic transducer 100 of FIG. 1, FIG. 2 shows an example of a liquid impermeable ultrasonic transducer 200, which is not prone to degradation over time due to liquid uptake. The liquid impermeable ultrasonic transducer 200 includes a casing 202, and a transducer head 204. The casing 202 includes a transducer head section 202a and a body section 202b, which are permanently joined. Suitable joining techniques to seal the casing 202 can include, e.g., welding (laser welding, friction welding, etc.) or similar methods, resulting in a fluid impermeable joint 242 (FIG. 3). In some cases, the casing 202 can be a single, integral part, as will be discussed below with reference to other embodiments. The casing 202 and transducer head 204 form a working portion of the transducer that is fully fluid impermeable and protects the contents of the casing from water intrusion.

The transducer head 204 is formed of a forward-facing portion of the casing 202 (forward facing meaning, in the direction of intended acoustic energy transmission). Other components of the transducer 200 visible from an exterior include a connector 208 for electrically connecting the transducer to a signal source (not shown), which can be connected with the casing 202 at, e.g., a nut 210 which is permanently attached around the casing 202 and connector 208 for providing a handling means for a user to adjust the position of the transducer. The casing 202, which contains electronic components, can also be backfilled with a potting material, such as epoxy, which may be inserted via a void 206 in the casing. Reference planes (3) and (4) refer to the section views shown in FIGS. 3 and 4, respectively.

FIG. 3 shows a side section schematic of the fluid impermeable ultrasonic transducer 200 of FIG. 2, with attention to interior details thereof. The casing 202 includes the transducer head 204, which includes a concave focusing lens 212 bounded by a narrow transducer head rim 214. The focusing lens 212 includes a thin acoustic matching layer disposed across all or most of the lens surface. Matching layers are discussed in further detail below with reference to FIGS. 9 and 12-13, e.g. matching layer 370 (FIG. 9).

Opposite the concave focusing lens 212, the transducer head back 216 is connected with an actuator 222, which is a piezoelectric disk. The actuator 222 includes a positive electrode 226 and a negative electrode 228, with the positive electrode being arranged across the center of the actuator toward the inner cavity 218, and the negative electrode being arranged in a ring around the perimeter of the actuator and across the actuator toward the transducer head 204, as discussed further below with reference to FIG. 6. It will be understood that this arrangement of electrodes is particular to a class of actuators, and that the disclosure encompasses electromechanical actuators that may have different arrangements of electrodes. Further, in alternative embodiments, the actuator 222 may be a different type of actuator than a piezoelectric actuator, such as a magnetorestrictive actuator, voice coil actuator, or other comparable electromechanical actuator.

The actuator 222 is joined or bonded to the transducer head back 216 such the actuator can impart vibrations through the transducer head 204. According to some embodiments, the actuator 222 is bonded to the transducer head back 216 by an adhesive such as a layer of high-strength epoxy or comparable material. The bonding is preferably achieved by a thin and substantially uniform layer of adhesive, so as to maximize the coupling of the acoustic energy from the actuator to the transducer head, while minimizing the potential for delamination. The actuator 222 is also connected with a backing material 224, which includes a loaded matrix. The backing material 224 is composed of one or more materials having suitable mass to firmly hold the actuator 222 in place against the transducer head back 216 when the actuator is operating, and suitable acoustic impedance to effectively deaden reverberations traveling back through the casing 202, so as to minimize or prevent echo effects from interfering with the acoustic signal generated at the actuator. According to some embodiments, the acoustic impedance of the backing material 224 is approximately 15 Mrayl. In various embodiments, the acoustic impedance of the backing material 224 can vary, e.g., from about 13.5 to about 16.5 Mrayl, or from about 8 to about 28 Mrayl. The backing material 224 can be composed of any suitable acoustically absorptive substance, such as an epoxy matrix. In specific embodiments, the backing material 224 is a composite material formed of a damping polymer matrix impregnated with one or more ceramic and/or metallic materials or particles, such as an epoxy matrix impregnated with copper, silicon carbide, titanium dioxide, tungsten, or the like.

The specific concentrations and composition of particles in the backing material can be varied to adjust the acoustic impedance. The desirable acoustic impedance of the backing material generally falls between a maximum value at the acoustic impedance of the piezo material, and a minimum value of about one-third the maximum. A closer match of acoustic impedance results in higher efficiency, albeit with more pronounced reverberations; while increasing the gap in impedances reduces reverberations at the cost of efficiency. Thus, the specific acoustic impedance of the backing material can be selected in part based on the specific application for which the transducer is intended, ranging from high-power applications where reverberations are acceptable to high precision applications where reverberations should be minimized. In accordance with some embodiments, the backing layer can be formed of more than one material, and may include particles of an acoustic scattering material suspended in an acoustic absorbing material. Such backing layers are preferably acoustically homogeneous. This homogeneity can be achieved by fabricating the backing layer such that the particle distribution is also homogenous throughout the backing layer.

The backing material 224 substantially fills the space immediately behind the actuator 222, with channels and voids therein for accommodating electrical connections to the actuator 222. According to some embodiments, a conductive ring 220 is positioned about the backing material 224 for contacting an outer portion of the actuator 222. Positive 226 and negative 228 circuits are connected therein for transmitting electrical signals to positive electrode 230 and negative electrode 232 portions of the actuator 222, as will be shown in greater detail below with reference to FIGS. 4-6. According to some embodiments, an outer portion 220b of the conductive ring 220 can be used as a contact element for the negative electrode 232, and an inner portion 220a of the conductive ring can be used as a contact element for the positive electrode 230, with a remainder of the conductive ring insulating the inner portion from the outer portion. However, it will be understood that this arrangement may be reversed. Electrical signals carried by the positive and negative circuits 226, 228 can be controlled, conditioned, and directed to the circuits by electronics within a signal board 236. The signal board 236 is operably connected to the connector 208 by way of electrical pin 238 and socket 240. Specific details of the operation of the signal board 236 are described below with reference to FIG. 4.

Remaining space in the cavity 218 interior to the casing 202 can be filled with an inert sealant material, such as epoxy resin, which is operable to secure the internal components inside the casing 202. This sealant may also prevent water intrusion into the cavity 218 should the connector-end of the transducer 200 be exposed in liquid or immersed. The cavity 218 can be filled via a void 206 (FIG. 2), which is positioned distal from the focusing lens 212, and thus positioned far from a working fluid in which the transducer is immersed when in use.

FIG. 4 shows an end section schematic of the fluid impermeable ultrasonic transducer 200 of FIGS. 2-3, and specifically to a section showing the signal board 236. As shown, the signal board 236 includes an electrical matching network 246, which can include an inductor (not shown), and connects together an array of positive circuits 226. The positive circuits 226 are arranged together in this manner to provide reliable signal transfer across an entirety of the positive electrode 230 of the actuator 222 when the transducer 200 is in operation. The signal board 236 also includes voids 252 for passing through an array of negative (or ground) circuits 228 (FIG. 2). The negative (or ground) circuits 228 are similarly arrayed to contact the negative electrode 232 of the actuator 222 in an even manner. The network 246 is operably connected to the array of positive circuits 226 in order to couple incoming electrical signal more efficiently to the transducer. The network 246 is preferably a passive circuit. According to some embodiments, the network 246 can be an inductive passive circuit.

Figure 5:
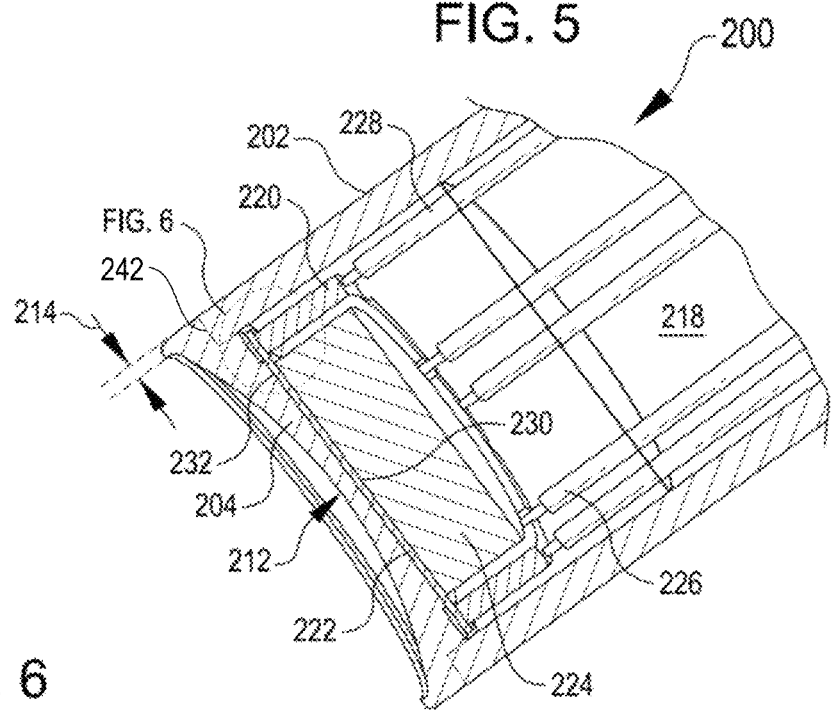
FIG. 5 shows a perspective view of another side section of the fluid impermeable ultrasonic transducer of FIGS. 2-4, with attention to the actuator and focusing lens.

FIG. 5 shows a perspective view of another side section of the fluid impermeable ultrasonic transducer 200 of FIGS. 2-4, with attention to the actuator 222 and focusing lens 212, in accordance with some embodiments. The actuator 222, which is sandwiched between the transducer head 204 and the backing material 224, is in electrical contact with the array of positive circuits 226, and with the array of negative (or ground) circuits 228 via a conductive outer ring 220, which is also interior to the casing 202. The actuator 222 is coaxially aligned with the focusing lens 212, and within a region defined by the transducer head rim 214. The negative electrode 232 wraps around the actuator 222 near the actuator's outer edge, while the positive electrode 230 is connected with an interior portion of the actuator 222, as shown in further detail with respect to FIG. 6.

Figure 6:
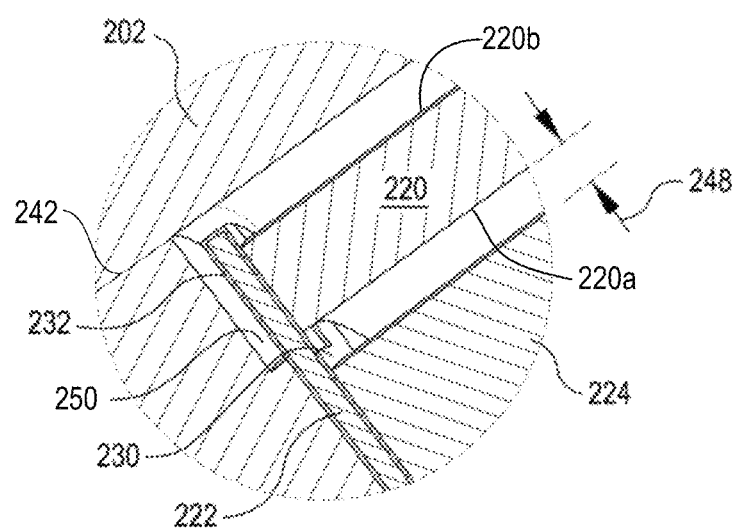
FIG. 6 shows a portion of the perspective view of FIG. 5 in greater detail, with attention to the actuator.

FIG. 6 shows a portion of the perspective view of FIG. 5 in greater detail, with attention to the actuator 222, positive electrode 230, and negative electrode 232, in accordance with some embodiments. The thicknesses of the positive and negative electrodes 230, 232 can be very small, i.e. on the order of microns or nanometers; therefore, features of FIG. 6 are not shown to scale, with visible thicknesses of the electrodes being for illustrative purposes only. The electrodes 230, 232 can be formed of a conductive material (e.g., gold, silver, copper, aluminum, or similar materials) on the order of 300 nanometers thick. The actuator 222 can be composed of a thin piezoelectric disk formed of a piezoelectric material (e.g. lithium niobate, barium titanate, polyvinylidene difluoride, lead zirconate titanate compositions, zinc oxide, aluminum nitride, or similar). To maximize efficiency, the thickness of the actuator 222 is selected to be close to half an acoustic wavelength as determined by the desired center frequency of vibration and the sound velocity in the piezoelectric disk, though in various embodiments, the thickness can be close to any suitable odd multiple of a half wavelength. For desired frequencies above 100 MHz, the optimal thickness could be below 10 microns. For desired frequencies below 1 MHz, the thickness could be over 1 millimeter. Around 10 MHz, the optimal thickness is in the range of a few hundred microns for typical piezoelectric disk materials. In some specific embodiments, e.g. for a design center frequency on the order of 12 MHz, an optimal thickness is preferably about 275 microns (or an odd multiple of 275 microns). The positive and negative electrodes 230, 232 are electrically isolated from each other, with the negative electrode 232 wrapping around the circumference of the actuator 222, and the positive electrode 230 occupying space within that circumference. There may be a clearance or gap 250 positioned around the perimeter of the actuator 222 between the actuator and casing 202; and the conductive outer ring 220 and backing material 224 can also be electrically isolated from one another by a conducing ring clearance 248. Both clearances 250, 248 can be filled with an electrically insulating material, such as an epoxy resin.

Various other embodiments of transducers can include similar features to those of transducer 200 as described above with reference to FIGS. 1-6, with alternative assemblies of casing and transducer head-face components. Where possible, like numbering is used throughout to describe components of the various transducers having similar functions. It will be understood that, unless specifically contraindicated, components of one transducer assembly may be combined with components of another transducer assembly disclosed herein without deviating from the spirit of this disclosure.

FIG. 7 shows a side view of a second fluid impermeable ultrasonic transducer 300, according to some embodiments of the present disclosure. The transducer 300 includes a case 302, with similar exterior features to those described above with respect to the transducer 200 of FIGS. 2-6, and an interface 308 for operably connecting the transducer with a signal source. The transducer 300 further includes an attenuation layer 350 positioned on the casing 302 around a perimeter of the transducer head 304 and circumscribing aperture lens 312 (FIG. 8). Note that, in various embodiments, the attenuation layer 350 can be omitted. In contrast with the transducer 200 of FIGS. 2-6, in which casing 202 and transducer head 204 were joined, the transducer 300 is water-impermeable by virtue of the transducer head 304 being an integral part of the casing 300.

FIG. 8 shows a side section schematic of the fluid impermeable ultrasonic transducer 300 of FIG. 7, in accordance with embodiments. Similar to the transducer 200 of FIGS. 2-6, the transducer 300 includes an actuator 322 positioned between the transducer head 304 and a backing material 324, which can have similar compositions and configurations as the transducer head 204 and backing material 224 described above. An interior cavity 318 of the casing 302 can be filled by an insulating and waterproofing fill material as well, such as an epoxy resin. The actuator 322 can be operably connected with a signal board 336 in similar manner to the actuator 222 and signal board 236 described above. The actuator 322 is sandwiched between the transducer head 304 and a backing layer 324, and surrounded by a conductive ring 320 that provides electrical connections to the actuator 322. The lens shapes shown for transducers 200 and 300 (i.e., larger aperture lens 212 shown in FIG. 3 and smaller aperture lens 312 shown in FIG. 7) are not restricted to use on these respective casing types (connected transducer head/casing shown in FIG. 3, integral transducer head/casing shown in FIG. 7). Except where explicitly stated otherwise, the structural features of each transducer described may be used interchangeably. If desired, the lens shape and the size of the transducer electrode coupled with the lens can be adjusted to control the acoustic beam size of the transducer.

The transducer 300 provides a different construction of the transducer head 304 compared to the transducer head 204 described above with reference to FIGS. 2-6. The transducer head 304 includes a focusing lens 312 defining a focusing shape having a smaller diameter than the actuator 322. This construction contrasts with transducer head 204 (FIGS. 2-6) in which the focusing lens 212 was larger in diameter than actuator 222. The smaller geometry of the focusing lens 312 operates to reduce the impact of internal acoustic reflections in the material of the transducer head 304, as illustrated with reference to FIGS. 15-18 and as discussed below. The focusing lens 312 is coated with a matching layer similar to the lens surface 212 of FIGS. 2-6. Details about the matching layer are discussed below with reference to FIGS. 9 and 12-13. An attenuation layer 350, or outside absorbing layer, circumscribes the focusing lens 312 to reduce or eliminate unfocused vibrations that might otherwise originate from the larger transducer head rim 314.

The attenuation layer 350 is positioned on the transducer head 304, specifically on the transducer head rim 314, adjacent to and around a perimeter of the transducer end face 312. The attenuation layer 350 is configured to prevent inadvertent transmission of unfocused or reflected vibration from the transducer head rim 314. A central void 352 in the attenuation layer 350 allows vibrations to pass unimpeded from the focusing lens 312 past the attenuation layer in a focused manner. A central void diameter 354 is preferably the same size as the transducer end face 312. A width 358 of the attenuation layer 350 is preferably wider than the actuator 222, so that little to no unfocused or reflected vibration is passed from the actuator out from the transducer head rim 314. In some embodiments, the attenuation layer 350 may extend as far as an edge of the casing 302. A depth 356 of the attenuation layer 350 is sufficient to provide adequate attenuation to absorb substantially all transmissible vibration from the transducer head rim 314. In some embodiments, the attenuation layer 350 is sufficiently thick (i.e. has a minimum thickness) sufficient to absorb at least 90% of sound energy (i.e., reducing sound energy by 10 dB) per pass through the attenuation layer. In specific embodiments, the depth 356 of the attenuation layer 350 can range from about 0.5 mm to 5 mm. A total depth 360 from the actuator 322 to an end of the attenuation layer 350 can range from about 0.6 mm to about 10 mm. However, the thickness of the absorbing layer is preferably selected to be the smallest thickness that damps at least 10 dB.

FIG. 9 shows a side section schematic of the fluid impermeable ultrasonic transducer 300 of FIGS. 7-8 with attention to the actuator and focusing lens. As shown, the case 302 terminates at the transducer head 304, which includes a peripheral portion defining the transducer end rim 314, and a central portion defining the focusing lens 312. The attenuation layer 350 is position on the transducer head rim 314 adjacent to the head face 312. The width 358 of the attenuation layer 350 occupies most of a width 360 of the transducer head rim 314. Within the transducer case 302, a cavity 318 contains the actuator 322, which is pressed up against the transducer head 304, and sandwiched between the transducer head and a backing layer 324. A negative or ground electrode 332 is positioned on the actuator 322 adjacent the transducer head 304 and connected about the rim of the actuator 322 with the conductive ring 320. Positive leads are routed adjacent the conductive ring 320 to contact the positive electrode 330 positioned between the actuator 322 and the backing layer 324. The matching layer 370 is positioned on the head face 312 for improving acoustic transmission from the head face. The matching layer 370 is discussed in further detail with reference to FIGS. 12-13.

According to some alternative embodiments, further transducer elements can be provided in combination with one or more of the transducers described above with reference to FIGS. 2-9. For example, FIG. 10 shows a side view of a third fluid impermeable ultrasonic transducer 400 having secondary transducer element 462, according to some embodiments of the present disclosure. The transducer 400 includes a case 402 with similar features to the cases 202, 302 of transducers 200, 300 described above, with an interface 408 for operably connecting the transducer with a signal source. The transducer 400 further includes a dual-purpose backing and attenuation layer 450 positioned on the casing 402, and a secondary transducer element 462 positioned on the backing/attenuation layer.

FIG. 11 shows a side section schematic of the fluid impermeable ultrasonic transducer 400 of FIG. 10, showing feature and components of the transducer which are similar to those of transducer 300 shown in FIGS. 7-9, and in which similar parts have like numbering. Notably, the secondary transducer element 462, which can include its own actuation and focusing means (not shown), is connected with the backing/attenuation layer 450 connected with the transducer head 404 such that the backing/attenuation layer acts as a both a backing layer for the secondary transducer element and as an attenuation layer for sound energy emitted by the primary actuator 422. The secondary transducer element 462 can be arranged in a ring around a primary focusing lens 412 of the transducer 400, can operate in combination with or independently of the primary actuator 422, and can operate with the same or preferably a different range of acoustic frequencies. Primary actuator 422 and head face 412 as shown herein are analogous to the actuator 322 and head face 312 of transducer 300 shown in FIGS. 7-9. According to some embodiments, the secondary transducer element 462 has an open, inner diameter 464 that substantially matches the inner diameter 452 of the attenuation layer 450. The thickness 456 of the backing/attenuation layer 450 is sufficient here not only to dampen vibrations through the primary transducer head rim 414 caused by the primary actuator 422, but also to deaden echoes passed back from the secondary transducer element 462.

Embodiments of transducers as discussed above are suitable for propagating acoustic waves into a medium based on an electrical signal provided to the actuators therein. However, embodiments can include further features for enhancing the transfer of acoustic energy from the actuator to the medium. Principally, one or more matching layers may be employed on a focusing lens (e.g. head face 212, 312, 412) for improving the energy transmission.

FIG. 12 shows a simplified schematic diagram of the working components of an immersion transducer 500 employing a matching layer, or matching layer 514, in accordance with some embodiments of the present disclosure. Aspects of the transducer 500 can be employed in combination with features of each of the transducers 200, 300, 400 discussed above with reference to FIGS. 2-11.

The transducer 500 includes a transducer head element 510, actuation element 530, backing element 540, backing cavity 544, and electrical matching network or control element 550. In operation, an electrical signal, which can define a desired acoustic output, is passed through an input circuit 554 to the electrical matching network element 550. This electrical matching network element 550 can include suitable electronics to filter, attenuate, amplify, or otherwise correct an electrical signal so as to efficiently connect an input signal (e.g., a driving signal) to an electrical load such as the transducer actuation element 530. According to some embodiments, the matching network element 550 can include an inductive high-pass circuit 552, or other suitable filtering circuit for conditioning the input signal. In operation, the matching network element 550 can include a simple high-pass filter which allows high-frequency electrical signals to pass without significant attenuation (such as the high-frequency driving signals corresponding to acoustic signals), while filtering low-frequency signals to block low-frequency phenomena. According to various other embodiments, the control element 550 can include any suitable filter or filter combination for attenuating signals from the input circuit 554.

The control element 550 is operably connected with the actuation element 530 by way of an interconnect 538. The actuation element 530 includes an actuator 536, which can be a piezoelectric disk or comparable actuator. The actuator 536 is connected on opposite sides to a positive electrode 534 (shown here connected with the interconnect 538) and a negative or ground electrode 532 (which is connected to ground or to a negative circuit, not shown). The actuator 536 responds to the driving signal by producing physical vibrations according to a frequency of the driving signal. The actuation element 530 is bounded on one side by the transducer head element 510 and on the opposite side by the backing element 540 in a backing cavity 544. The backing element 540 is composed of a backing material 542 which has a composition and/or microstructure suitable for absorbing vibration while in contact with the actuation element 530 and while biasing the actuation element 530 toward the transducer head element 510. The backing cavity 544 may be open, or may be filled with an insulating and/or waterproof material for insulating the actuator element 530 from moisture or other external contaminants.

The transducer head element 510 faces a medium 502 into which the transducer 500 is configured to direct acoustic energy. The transducer head element 510 includes a body of the transducer head 512, a focusing lens 518, and a transducer head back 520 that is positioned adjacent the actuator element 530. The focusing lens 518 is made up of a matching layer 514 positioned on a surface 516 of the transducer head body 512. The transducer head body 512 is preferably composed of a rigid, lightweight, and non-porous material that does not take up water. For example, according to some embodiments, the transducer head body 512 can be a metal or metal alloy that is preferably resistant to corrosion. In various embodiments, materials for the transducer head can include, but are not limited to: aluminum (Al), beryllium (Be), cadmium (Cd), carbon (C), chrome (Cr), copper (Cu), germanium (Ge), gold (Au), iron (Fe), lead (Pb), manganese (Mn), molybdenum (Mo), nickel (Ni), niobium (Nb), phosphorous (P), platinum (Pt), selenium (Se), silicon (Si)), silver (Ag), tin (Sn), titanium (Ti), tungsten (W), vanadium (V), zinc (Zn), or zirconium (Zr) and alloys or composites of any two or more of the foregoing, including complex alloys such as stainless steels which might also contain some non-metal or non-semi-metal components. Suitable non-metal or non-semi-metal components can include, e.g., silicon, glass, quartz, or various ceramics. The transducer head is preferably corrosion resistant and liquid impermeable, particularly fluid impermeable, such that the transducer head surface and casing not only exclude liquid, but resist degradation or change in shape when exposed to liquid for long periods of time. In some embodiments, the transducer head material can be completely inert to a fluid couplant such as water, with a long-term penetration depth of zero and weight loss due to corrosion of zero. The transducer head body 512 can be integrally connected with or include a casing that wraps around internal components of the transducer 500. For completely inert materials, a penetration depth and weight loss of zero may be assumed (or penetration/loss may be unmeasurable). For minimally reactive materials, the tolerable penetration depth and weight loss depends on the target lifetime of the transducer and the acceptable change in lens focal properties over that lifetime. In some embodiments, the maximum permissible value of material weight loss is on the order of 0.1% per year or less.

The matching layer 514 is made up of a material having an acoustic, i.e. mechanical, impedance that is between an impedance of the transducer head body 512 and the medium 502. This matching layer 514 can significantly improve the transmission of acoustic energy into the medium 502, particularly when the transducer head body 512 is composed of a material with high impedance. Fluid impermeable metals and metal alloys that have favorable corrosion properties cover a broad range of acoustic impedance and have values typically from 10 to 100 MRayl. Preferably, the transducer head and casing material should be selected to match the acoustic impedance of the selected piezoelectric material of the actuator 536 as closely as possible. For typical piezoelectric materials, which are ceramics having acoustic impedances in the range of approximately 15 to 43 MRayl, fluid impermeable metals and metal alloys having acoustic impedances at the lower range of 10-100 MRayl are preferred in order to promote acoustic energy transfer efficiency. For example, in specific embodiments where the transducer head body 512 is composed of vanadium, the expected acoustic impedance of the transducer head body is approximately 36.2 MRayl.

The acoustic matching layer 514 is selected to promote acoustic energy transfer from the transducer head body 512 to the medium 502, which is typically a couplant such as water, gel, or another aqueous solution. The acoustic impedance of water, for example, is about 1.5 MRayl. Acoustic energy transfer losses occur when a sound wave is propagated from one medium directly to another medium across stepped acoustic impedance, with an optimal coupling achieved by a single intermediary layer according to the following Equation 1, where $Z_m$ is the intermediate layer impedance, and $Z_l$ and $Z_c$ are the impedances of the transducer head body 512, and the medium 502, respectively.

$$Z_m = \sqrt{Z_l Z_c} \qquad \text{Equation 1}$$

In accordance with embodiments, the matching layer 514 is composed of a material selected to maximize acoustic energy transfer between the transducer head body 512 and the medium 502, which is also amenable to permanent bonding with the surface 516 of the transducer head body and while being resilient against intrusion or degradation by the medium. According to a particular embodiment where the transducer head body 512 is vanadium with an approximate acoustic impedance of 36.2 Mrayl, and the medium is water or a comparable aqueous solution with an acoustic impedance of about 1.5 Mrayl, optimal acoustic impedance for a single intermediate layer is approximately 7.3 Mrayl. According to various embodiments, the matching layer 514 is composed of a material having acoustic impedance on the order of 7.3 Mrayl. According to some specific embodiments, the matching layer 514 is composed of a fluoropolymer such as polyvinylidene difluoride (PVDF) or similar polymer coating having an acoustic impedance between about 4-10 Mrayl or, in some cases, between about 4-5 MRayl. According to some other embodiments, the matching layer 514 can be composed of a graphite coating having an acoustic impedance between about 6-8 Mrayl. According to various embodiments, the matching layer 514 has an acoustic impedance ranging from about 5-10 Mrayl, from about 4-10 Mrayl, or from about 6-8 Mrayl. In some specific embodiments, the matching layer 514 has an impedance of about 4 Mrayl. According to various embodiments, the matching layer can be composed of any of: PVDF, graphite, amorphous carbon, or polymer/particulate composites include but not limited to a polymer matrix (e.g., epoxy or similar) and alumina, tungsten, glass, or other comparable particulate matter.

In some embodiments, the efficiency of the acoustic energy transfer between the focusing lens body 512 and the medium 502 is improved by tuning the thickness of the matching layer 514. The matching layer 514 is preferably applied using a coating technique, such as spray coating, spin coating, sputtering, diffusion bonding, or the like, and subsequently brought to a consistent thickness throughout. A thickness of the matching layer 514 can be adjusted by, e.g., machining, pressing, spinning, or any suitable combination of the above or similar processes. Preferably, the thickness of the matching layer 514 is adjusted to match a quarter wavelength corresponding to the targeted frequency for which the transducer 500 is intended to be used at the speed of sound through the selected material of the intermediate layer. Alternatively, the matching layer 514 can have a thickness approximately equal to a ¾ wavelength, or any other odd multiple of a quarter wavelength, such that reflection or destructive interference is minimized. For example, for an ultrasound transducer with a target frequency (or nominal frequency) of about 12 MHz, a suitable matching layer 514 may have a thickness of approximately 60 μm (example for graphite). For a given intermediate layer, a transducer can generate focused acoustic energy at wavelengths varying from about −25% from a nominal wavelength value that corresponds to the target frequency, up to about +25% from the nominal wavelength. Thus, according to some embodiments, a transducer having a single intermediate layer with a thickness tuned for 12 MHz can accommodate signals ranging from about 9 MHz to about 15 MHz at high efficiencies (typically on the order of 10% to 20%) and can be used outside of that range at lower efficiencies. For example, fluid impermeable transducers may also have nominal frequencies in the range of 2 to 15 MHz. According to various embodiments, the matching layer 514 can vary in thickness from about 30 to 80. In some embodiments, the matching layer 514 thickness can vary from the nominal thickness by approximately 14% or less. However, further flexibility in material choice, efficiency, and target frequency can be obtained using more than one intermediate layer. In various alternative embodiments, the matching layer thickness can be approximately equal to an odd multiple of a nominal value corresponding to the quarter wavelength of the target frequency.

FIG. 13 shows a simplified schematic of the working components of an immersion transducer 600 employing multiple matching layers 614, 620, in accordance with some embodiments of the present disclosure. The transducer 600 as shown has similar features to those of the transducer 500 described above with reference to FIG. 12, with like parts given like numbering. For a transducer head body 612 formed of a fluid impermeable metal or metal alloy with an acoustic impedance of 17 to 42 Mrayl, and a medium 602 of water or any comparable aqueous substance having an acoustic impedance of about 1.5 Mrayl, an optimal acoustic impedance for a single intermediate layer would be approximately 5 to 8 Mrayl, respectively. However, the acoustic energy can be transferred from the transducer head body 612 to the medium 602 through a first intermediate layer 614 having a first acoustic impedance, and subsequently through a second intermediate layer 620 having a second acoustic impedance, where the first intermediate layer has a higher acoustic impedance than the second intermediate layer, and wherein the first and second intermediate layers satisfy Equation 1 above for optimized acoustic energy transfer with respect to each other. For example, the acoustic impedance of the first intermediate layer 614 (i.e., $Z_{m1}$) falls between L and the acoustic impedance of the second intermediate layer 620 (i.e., $Z_{m2}$), such that the system of equations in Equation 2, below, is satisfied. When assembled, acoustic energy is transferred from the transducer head body 612, through the first intermediate layer 614, and from a first intermediate layer interface 618 to the second intermediate layer 620. The acoustic energy is subsequently transferred through the second intermediate layer 620 and out of focusing lens 622 into the medium 602. Each respective intermediate layer 614, 620 is formed to a respective thickness that corresponds to a quarter wavelength of the nominal frequency of the transducer 600 through the selected material of each respective intermediate layer, as discussed above with reference to the single intermediate layer 514 (FIG. 5).

$$Z_{m1} = \sqrt{Z_t Z_{m2}}$$

$$Z_{m2} = \sqrt{Z_{m1} Z_c} \qquad \text{Equation 2}$$

FIG. 14 shows a simplified schematic of the working components of an immersion transducer 700 employing a diffractive focusing lens 714, in accordance with some embodiments of the present disclosure. The transducer 700 as shown has similar features to those of the transducers 500, 600 described above with reference to FIGS. 12-13, with like parts given like numbering. A transducer head element 710 differs from transducer head elements 510, 610 described above insofar as the element includes a transducer head body 712 defining a diffractive head face 714 opposite the transducer head back 716. The diffractive head face 714 includes a set of diffractive echelettes that are operable to direct acoustic energy to a predetermined focal length, in accordance with embodiments.

As discussed above, the focusing lens (e.g. head face 212, 312, 412, FIGS. 3, 8, and 11) is sized to receive and redirect acoustic energy from an actuator (e.g. actuator 222, 322, 422) toward a focus distal of the focusing lens from the transducer. However, the focusing lens can be larger than, smaller than, or approximately the same size (in diameter) as the actuator. Slightly different mechanics apply, depending on whether the acoustic head face is smaller than, or larger than, the actuator. Such mechanics are more directly observable when the transducer is used as both an emitter and receiver. The actuator of a transducer can be used to sense acoustic energy that is emitted and reflected as an echo back to the transducer, as well as to sense acoustic energy that reflects within components of the transducer. The effects of the transducer head geometry on such sensing applications is discussed below with reference to FIGS. 15-20.

Figure 15:
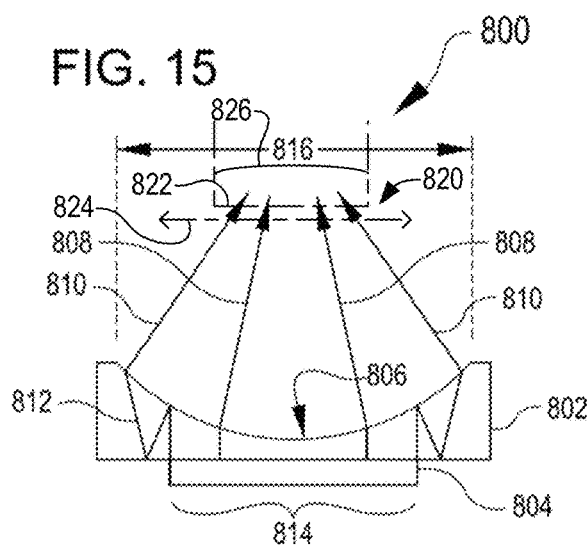
FIG. 15 shows a simplified side view schematic of a curved focusing lens with a relatively large focusing region of the focusing lens, in accordance with some embodiments.

FIG. 15 shows a simplified side view schematic of an assembly 800 of a transducer head 802 with a curved focusing lens 806 and an actuator 804, in accordance with some embodiments. The transducer head 802 defines a relatively large focusing region 816 of the focusing lens 806, which is larger than a diameter 814 of the associated actuator 804, in accordance with some embodiments. The arrangement of FIG. 15 is similar to that shown above with respect to focusing lens 212 (FIG. 3). The focusing lens 806 shown herein is a concave, curved surface of a transducer head 802, which defines a focusing region 816. An actuator 814 is positioned behind the transducer head 802 and transmits sound waves forward into the transducer head. A first subset of the acoustic energy 808 is transmitted directly through the transducer head 802 and emitted from the focusing lens 806 at a low angle, such that the acoustic energy converges. However, a second subset of the acoustic energy 810, which encounters a steeper angle than the first subset, may be reflected 812 in the material of the transducer head 802 before being emitted from the focusing lens 806. The reflection 812 can result in some degree of noise being reflected back to the actuator, which may in some cases affect the use of the transducer as both an emitter and sensor in the same application as this noise may be delayed sufficiently in time so as to impact the transducer during a period when it is being used as a sensor. For reference, a position of a sample microplate 820 is shown, including a top surface 822 of a well and a bottom surface 824 of the plate. The exact position may vary depending on the height of fluid in the well and the size of the well, and the assembly 800 may accommodate many types and sizes of sample microplates. Acoustic reflection can occur at material boundaries, e.g., at either of the top and bottom surfaces 822, 824 of the microplate 820, and at the fluid/air boundary 826. For sensing applications, e.g. detecting the height of fluid in a well, it is not necessary for the fluid/air boundary 826 to be near a focal plane of the transducer head 802. For droplet ejection applications, the transducer head 802 or microplate 820 will be moved in order to place the focal plane near the fluid/air boundary 826.

Figure 16:
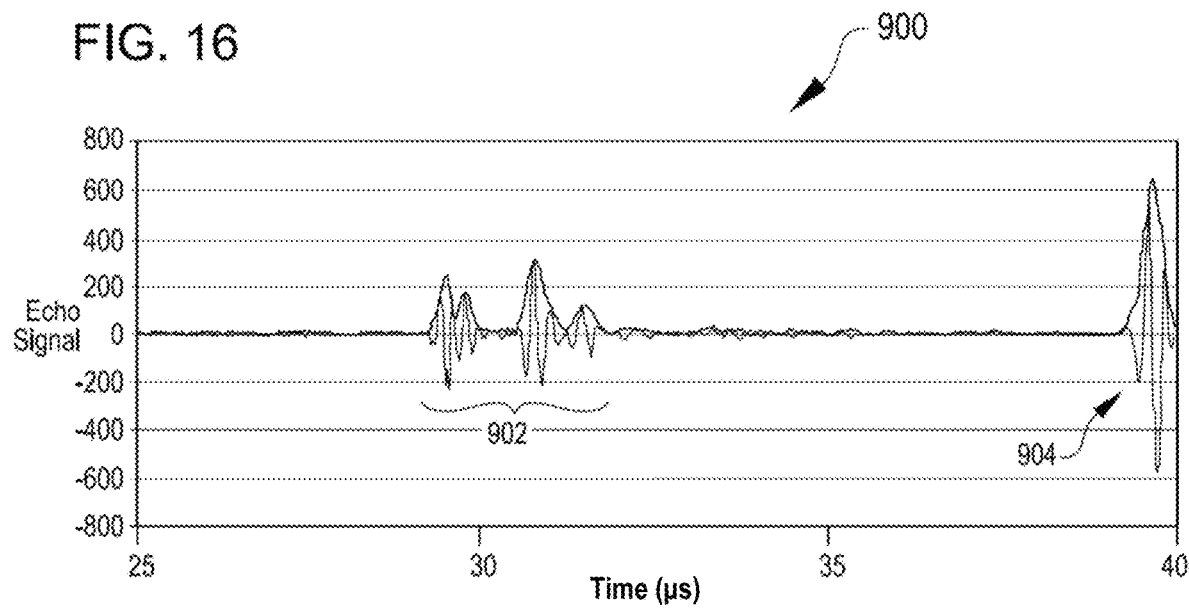
FIG. 16 shows a graphical illustration of an echo signal caused by a curved focusing lens similar to the curved focusing lens shown in FIG. 15.

FIG. 16 shows a graphical illustration of echo signal data 900 caused by a curved focusing lens similar to the curved focusing lens 806 shown in FIG. 15. The echo signal data 900 include a first signal 902, which corresponds to two echoes caused by acoustic reflections from different portions of the plate, for example the top and bottom surfaces 822, 824, and can include tailing or ringing caused by reflection and/or redirection of acoustic energy within the transducer head; and a second signal 904, which corresponds to the transducer acoustically probing a medium and receiving an echo, i.e. from the fluid/air boundary 826. The two echoes occurring in the first signal 902 are visible at about 20-30 µs and 30.5 to 32 µs. Both the first signal 902 and second signal 904 are distinct from background, thus noise can be readily identified and disregarded. However, if the transducer were receiving multiple acoustic signals in short order, differentiating the multiple echo signals from each other or from the background noise might become challenging. Ringing effects and the "double echo" effect caused by reflections within the transducer head 802 are exacerbated by the use of stiff, nonporous materials, such as the water-impermeable metals or metal alloys.

As discussed above, suitable acoustic/mechanical properties for the lens material include: acoustic impedances typically in the 10-30 MRayl range, relatively high and consistent (e.g. 4 km/s or higher) sound velocity, as well as resistance to corrosion, water absorption, bending, and acoustic absorption. Acoustic effects caused in such materials are typically reproducible, and can be corrected for in software. For example, means to mitigate or correct acoustic effects can include echo cancellation software, as used in conventional audio applications, and applied to reduce the secondary reflection following the initial peak of a signal. Furthermore, such materials generally transmit acoustic energy more efficiently than the more ductile and formable materials used in conventional transducers for NDT applications, so that significantly less energy is required to generate an acoustic signal when compared to systems employing conventional materials. It was found that the noise profile could be shortened, and reduced by comparison to the signal, by reducing the size of the focusing lens relative to the actuator, and further reduced by adding acoustically damping material to a periphery of the transducer head.

Figure 17:
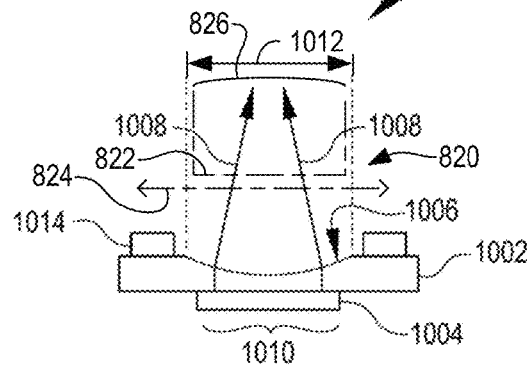
FIG. 17 shows a simplified side view schematic of a curved focusing lens with an outside absorbing layer and relatively small focusing region of the focusing lens, in accordance with some embodiments.

FIG. 17 shows a simplified side schematic of an assembly 1000 of a transducer head 1002 with a curved focusing lens 1006 and an actuator 1004, in accordance with some embodiments. The assembly 1000 includes an outside absorbing layer 1014 circumscribing a focusing region 1012 of the focusing lens. As shown, the focusing region 1012 is slightly larger than a diameter of the actuator 1010, but the extent of the focusing lens 1006 is reduced compared to that of the focusing lens 806 of FIG. 15, such that the concavity of the focusing lens is less pronounced, reducing the angle at which acoustic energy 1008 encounters the boundary of the head face. This reduced angle results in much less acoustic energy being reflected inside the transducer head 1002, thus reducing overall noise when the transducer emits acoustic energy. In some embodiments, an outside absorbing layer 1014 can be added to the transducer head 1002 outside of the focusing lens 1006, which can absorb stray acoustic energy that does reflect inside the transducer head without exiting the focusing lens. The arrangement of the illustrated assembly 1000 can significantly tighten both noise and signal compared to the assembly 800 of FIG. 15, resulting in increased resolution of signal as compared to noise. In some embodiments, the actuator 1004 can have a diameter 1010 that is the same size as the focusing region 1012 of the focusing lens 1006, or in some cases, slightly larger than the focusing region. For reference, a position of sample microplate 820 is reproduced, including a top surface 822 of a well and a bottom surface 824 of the plate. The exact position may vary depending on the height of fluid in the well and the size of the well, and the assembly 1000 may accommodate many types and sizes of sample microplates. Acoustic reflection can occur at material boundaries, e.g., at either of the top and bottom surfaces 822, 824, or from a fluid/air boundary 826 typically corresponding to the height of fluid in a well of the microplate 820.

Figure 18:
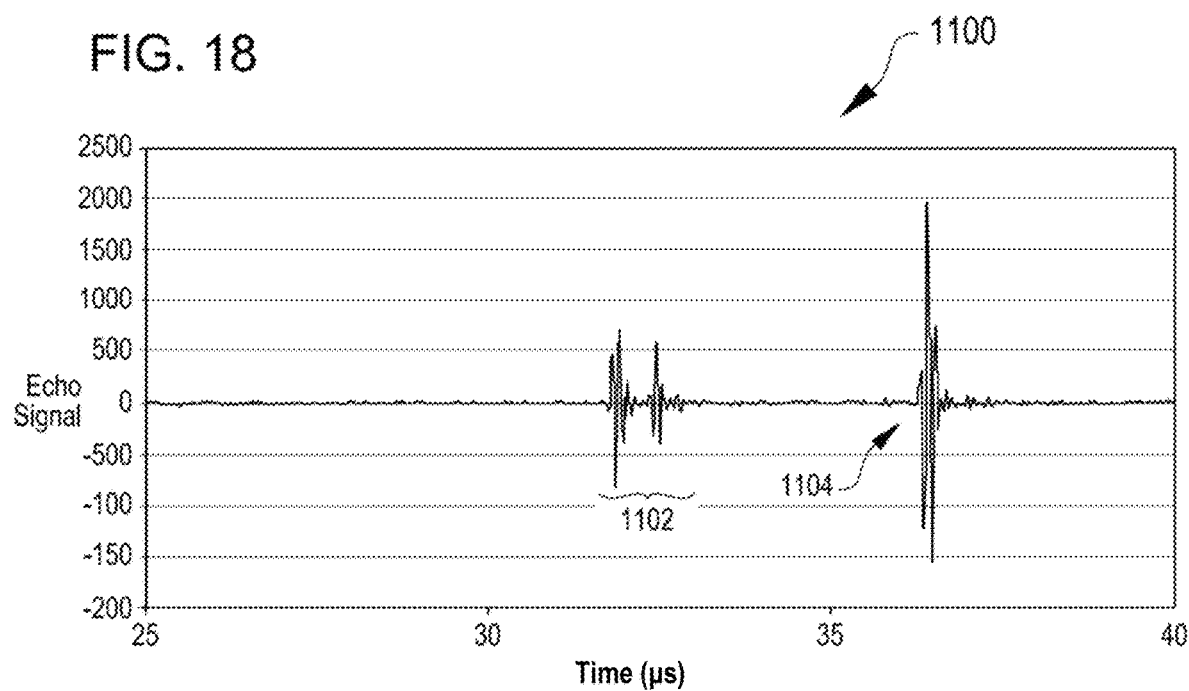
FIG. 18 shows a graphical illustration of an echo signal caused by a curved focusing lens similar to the curved focusing lens shown in FIG. 17.

FIG. 18 shows a graphical illustration of echo signal data 1100 caused by an assembly similar to assembly 1000 shown in FIG. 17, for comparison with the echo signal data 900 shown in FIG. 16. Signal 1102 is composed of two pulses reflecting from the bottom and top of a well plate, and signal 1104 is due to reflection from the surface of the fluid, i.e. the fluid/air interface 826, in the well. This signal can be compared to signal 902 of FIG. 16. In particular, the first signals 1102 as shown in FIG. 18 are narrower and are more clearly separated from one another than the corresponding first signals 902 shown in FIG. 16. Additionally, the echo signal data 1100 has less background noise than the echo data signal 900, particularly after each of the initial echo signals (1102, 902). This increased clarity and reduction in background noise show how the features of the transducer head assembly 1000 (FIG. 17) reduce echo and improve resolution. In general, decreasing the size of the focusing region (e.g. focusing regions 816, 1012 shown in FIGS. 15 and 17) decreases the signal while also decreasing the noise or ringing associated with said signal, though not at the same rate. Thus, the focusing region size of a transducer can be tuned to optimize the resolution of an echo signal and reduce the likelihood that a noise event will be misclassified as surface reflection.

Figure 19:
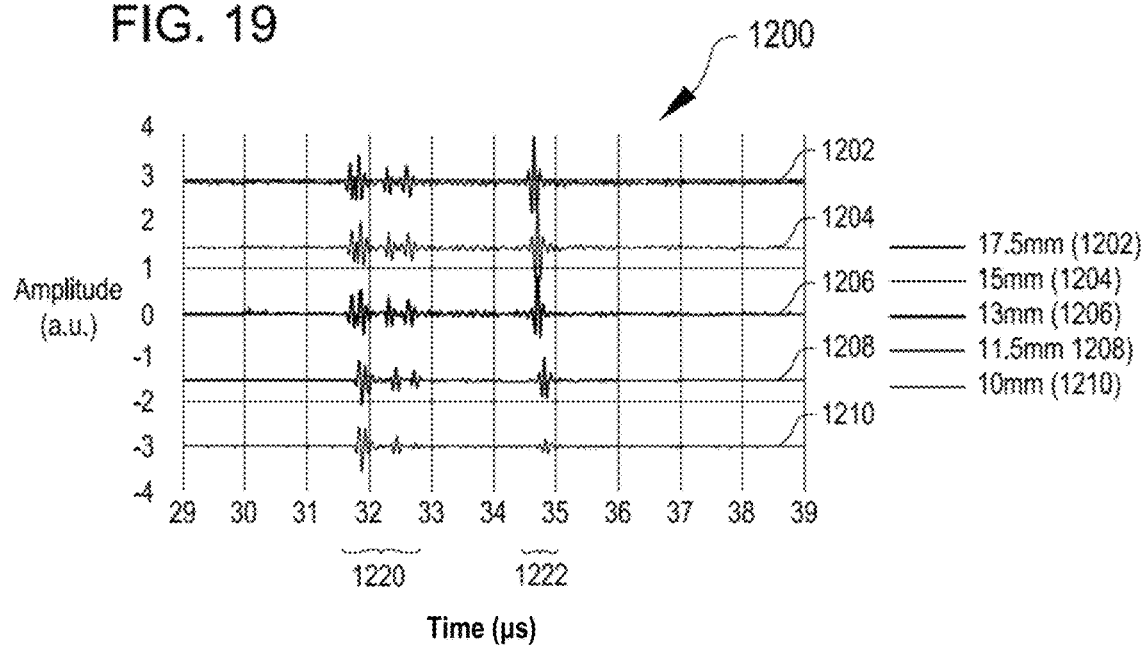
FIG. 19 shows a graphical illustration of echo signals for transducers having varying aperture sizes, in accordance with various embodiments.

FIG. 19 shows a graphical illustration of echo signal data 1200 for transducers having varying aperture sizes, in accordance with various embodiments. Transducer echo signal data 1202, 1204, 1206, 1208, 1210 are reproduced together on the same chart to illustrate variations in echo signal data associated with the respective sizes of each transducer's signal generating area, or aperture. For each transducer, a first signal 1220 corresponds to reflections of acoustic energy within the transducer, here showing echoes from the bottom of a well plate, and a second signal 1222 corresponds to a signal caused by reflection of acoustic energy from a target, in this case the free surface of a fluid in the well. As aperture size decreases (e.g., from a diameter of 17.5 mm for transducer data 1202 to a diameter of 10 mm for transducer data 2110), a decrease in amplitude of both signals is observed, along with reductions in ringing associated with the first signal 1220. Thus, depending on the intended application of a transducer (i.e., from generating high-power signals only, to signal detection) an aperture size can be selected which provides adequate power while mitigating noise and/or ringing. Similarly, the aperture size impacts the beam size of an acoustic signal at the focus, as shown with reference to FIG. 20.

Figure 20:
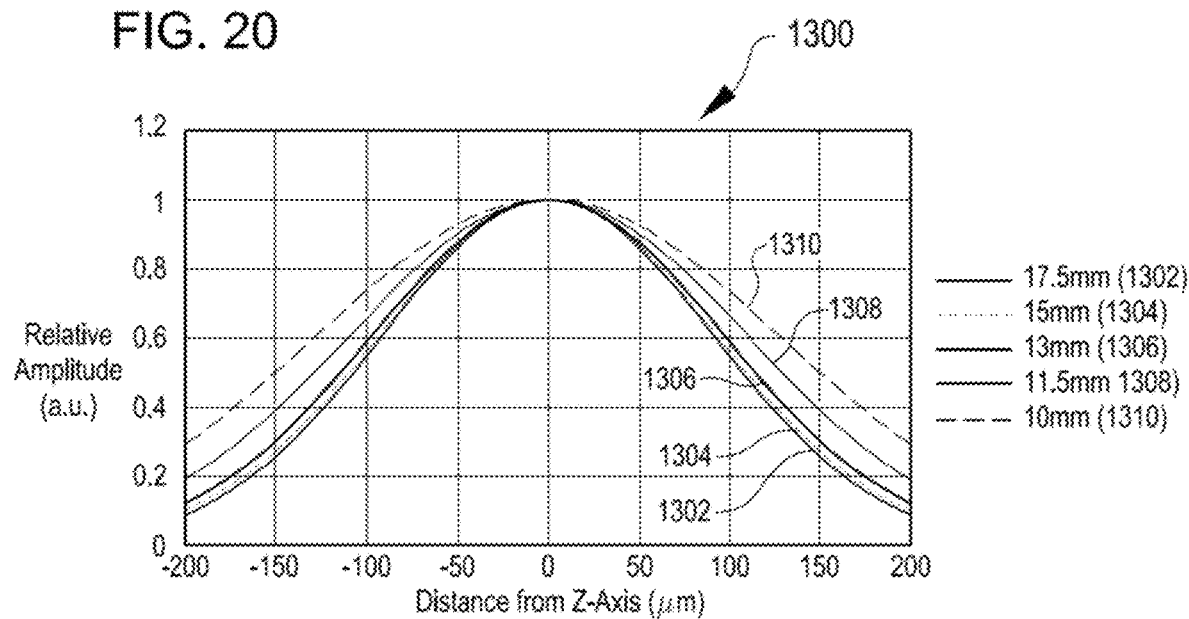
FIG. 20 shows a graphical illustration of the beam size associated with transducers having varying aperture sizes, in accordance with various embodiments.

FIG. 20 shows a graphical illustration beam size data 1300 associated with transducers 1202, 1204, 1206, 1208, 1210 (FIG. 19) having varying aperture sizes, in accordance with various embodiments. The Y-axis shows the amplitude of the acoustic signal at a distance from the central axis of the acoustic beam path, taken at the focal distance of the transducer and normalized against the amplitude of the acoustic signal at the focus. A wider curve indicates a more defocused beam, and a narrower curve indicates a more focused beam. As shown, the defocus curves 1302-1310 increase in width as the aperture sizes 1202-1210 (FIG. 19) decrease in size. Thus, increased aperture size results in improved focus, while being inversely related to signal clarity. However, increasing focal aperture size presents diminishing returns in improving the focus of the acoustic beam, shown by the relatively small differences between defocus curves 1302-1306 by comparison to the differences between defocus curves 1306-1310.

For applications requiring large power handling capability, it is generally desirable to have a large aperture area, as power scales roughly with aperture area. Thus, for a given target F-number or target beam angle, the focal length and aperture size can be increased to accommodate a desired increase in power handling. However, the larger focal lengths that result from this increase in dimension will increase the length of the acoustic beam path in the medium, thus increasing attenuation. Aperture size is therefore selected, depending on the intended application, to balance the need for focus with the need to mitigate noise or ringing. According to some embodiments, the aperture size can range from about 10 mm to about 17.5 mm. In some specific embodiments, the aperture size can range from about 10 mm to about 13 mm, or can be about 11.5 mm. Suitable F-numbers for high-power applications can vary, but in specific embodiments can range from about 0.8 to 4, or preferably from about 1.5 to 3, or from about 2 to 2.5.

As described above, adjusting the lens aperture diameter can influence the beam size at the focus and the ringing level. However, these parameters can alternatively or preferably be tuned by adjusting the size or diameter of the electrodes connected with the actuator. Referring back to FIG. 3, for example, the actuator 222 is a piezoelectric disk, with a positive electrode 226 disposed across the center of the disk toward the inner cavity 218, and a negative electrode 228 disposed in a round around the perimeter of the actuator. In such embodiments, adjusting the size of the positive electrode 226 in particular can control the area of the acoustic power generating zone of the actuator, with a higher area correlating to higher amplitudes and a wider beam area. Adjusting the electrode diameter can help to contain the beam size so as to reduce reverberations and ringing, as shown above with reference to FIGS. 17-20.

In various other embodiments, the lens thickness can be adjusted to change the time delay of reverberations in the lens material. For example, in at least one specific embodiment, the thickness at the center of the lens is matched to the quarter-wave length according to the nominal frequency of the transducer. Setting the central lens thickness to this quarter-wave value improves acoustic coupling from the actuator to the medium. In one embodiment, the nominal value of the lens thickness is 0.15 mm, (for a transducer designed to operate in the 10-12 MHz range) but can vary from about 0.1 to 0.2 mm.

In accordance with various embodiments, the focusing lens (e.g. focusing lens 212, 312, 312, FIGS. 4, 8, 11) can be either connected with a body of the transducer casing (202, 302, 402), or can be integrally connected with the casing, the focusing lens being formed therefrom by precision forming processes. FIG. 21 is a simplified block diagram illustrating a system 2100 for generating a focusing lens, in accordance with embodiments. The system 2100 can include a user input module 2102 for receiving user inputs including specific dimensions of the transducer's aperture diameter, depth, and shape, and/or performance criteria such as desired focal length, efficiency, and/or signal-to-noise requirements, which may or may not be dependent on a desired targeted medium, nominal focal length, and/or material choice. A modeling module 2104 can determine a needed focusing lens shape based on the user inputs. In some cases, the modeling module 2104 can determine characteristics of a matching layer for addition to the focusing lens based on the selected material of the focusing lens and a targeted medium. The modeling module 2104 can also be used to generate performance criteria 2110 for use in testing and/or validating the performance of a transducer.

A fabrication module 2106, which can include one or more automated or semi-automated fabrication mechanisms (such as laser ablation or precision CAD machining apparatus that selectively remove materials or those which add material such as three-dimensional printing methods or a vapor deposition apparatus, etc.) can be used to fabricate the focusing lens, which can include applying or adjusting the thickness of a matching layer; as well as secondary assembly tasks including assembling internal components of the transducer to the back of the focusing lens, optionally assembling the focusing lens with a transducer shell (e.g., by welding). The assembled transducer can be inserted into a testing module 2108, which can iteratively generate and/or receive acoustic signals via the transducer in order to measure the focal performance or efficiency of the transducer as an emitter, or to determine a signal-to-noise ratio, noise attenuation, and/or sensitivity of the transducer when operating as a sensor. In some embodiments, the testing module 2108 can operate over a long timescale to provide performance metrics under long-scale immersion. Performance criteria can be assessed 2110 and used iteratively to adjust parameters for defining the focusing lens at the modeling module 2104 through either the addition or removal of lens or matching layer material.

FIG. 22 shows an example process 2200 for making a water-impermeable ultrasonic transducer, in accordance with embodiments. The process 2200 may be implemented in conjunction with, for example, the system 2100 shown in FIG. 21. Some or all of the process 2100 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The process 2200 includes receiving an input indicative of one or more transducer performance criteria (act 2202). The input can include a nominal frequency at which the transducer is intended to operate, a material choice, a preferred focal length or a desired profile of the acoustic beam at the focus, or other characteristics. Next, a focusing lens geometry can be defined based on the input (act 2204), including an aperture size (i.e. diameter of the concave portion of the focusing lens) and a shape or depth of the focusing lens. A water-impermeable transducer head can be formed to conform to the defined focusing lens geometry, e.g. by precision machining or comparable method (act 2206), and the transducer head can be subsequently connected with a water-impermeable casing (act 2208) via water-impermeable means (e.g., permanent bonding, contact and/or laser welding, or other comparable method). Transducer electronics can be assembled with the transducer head and the casing (act 2210), including, e.g., an actuator bonded to a back of the transducer head, as well as a backing and electronic components, as discussed above with respect to transducers 200-700 (FIGS. 2-14). It will be understood that the step of connecting the transducer head with a casing may be omitted by forming the transducer head and casing from a single part, such that the components are integrally connected, as shown in FIG. 23.

FIG. 23 shows an example process 2300 for forming a transducer head and casing from a single integral part. The process 2300 includes receiving an input defining a focusing lens geometry (act 2302), which may be defined according to any suitable performance criteria of an ultrasonic transducer, as discussed with reference to FIG. 22 above. A water-impermeable casing can be formed that is closed at one end from a water-impermeable material, such as a non-corroding metal or alloy shell, by a combination of casting, machining, or comparable methods (act 2304), with the closed end being sized and having a sufficient thickness to accommodate a focusing lens therein. The focusing lens can then be formed by removing material from the closed end of the casing, e.g. by precision machining or comparable methods (act 2306). A casing and transducer head formed in such manner may the subsequently assembled with the various transducer electronics described above.

Any transducer head material having an acoustic impedance that differs significantly from the acoustic impedance of the target medium (e.g., ratios over 5 as occurs with typical metals with acoustic impedance Z>10 MRayl vs. an aqueous solution with acoustic impedance Z<2 MRayl) will tend to dissipate acoustic energy at the boundary between the focusing lens and the medium, with greater differences in impedance resulting in greater losses. In conventional immersion transducers, a transducer head is typically composed of a material that has low acoustic impedance, so that transfer losses are minimal; and which absorbs or attenuates some of the acoustic energy passing therethrough, so that noise is attenuated. However, in embodiments as described herein, the focusing lens is a fully water-impermeable material, such as a metallic (e.g. stainless steel or platinum) shell. Such materials can be more efficient emitters, absorbing less of the energy that passes therethrough. However, if such transducers emit directly into a low-impedance medium, they can lose significant amounts of acoustic energy to transition losses at the medium boundary, and can be prone to high degrees of noise and internal reflection. Such drawbacks can be mitigated by methods as discussed with reference to FIG. 24, below.

FIG. 24 shows an example process 2400 for modifying a transducer head and/or casing to mitigate transition losses and/or noise, in accordance with embodiments. The process 2400 includes receiving an input including information about the acoustic impedance of a transducer head material and a target medium in which a transducer is intended to operate (act 2404). A matching material (or materials) is selected for facilitating acoustic energy transfer between the focusing lens and the target medium based on the acoustic impedances of each (act 2406). A singular matching material can be selected according to any suitable combination of parameters as discussed above with respect to FIG. 12 and Equation 1. In some cases, multiple matching layers may be selected, in which case the respective materials can be selected according to any suitable combination of parameters as discussed above with respect to FIG. 13 and the system of equations of Equation 2.

Next, a nominal thickness of the matching layer material can be determined based on the acoustic impedance of the selected material and a nominal frequency at which the transducer is intended to operate (act 2308). As discussed with reference to FIG. 12, a nominal thickness preferably targets a one-quarter wavelength associated with the nominal frequency for sound waves passing through the matching layer material, or alternatively, any odd multiple of a one-quarter wavelength (e.g. three-quarters of a wavelength). The matching layer is applied to the focusing lens in a thickness equal to or greater than the nominal thickness (act 2410). In some cases, as when the matching layer is deposited in a manner that evenly and precisely distributes material, the matching layer can be directly applied to the preferred thickness. However, in some cases, the matching layer may be partially removed (e.g. by precision machining) to conform the entire matching layer to the preferred, nominal thickness (act 2412).

Further materials can be applied on the transducer head and adjacent to the focusing lens in order to mitigate noise or ringing. For example, an attenuation layer formed of an acoustically absorptive substance can be applied around a perimeter of the focusing lens (act 2414). In some cases, the attenuation layer can be used as a backing material for further components, such as one or more small, additional transducers, which can then be mounded thereon and operate using the attenuation layer as a backing material (act 2416) as described above with reference to transducer 400 (FIGS. 10-11).

Water-impermeable transducers as described above provide exceptionally uniform performance over time and do not degrade in response to fluid exposure, in contrast with conventional transducer designs. Consistent performance may be expected from such transducers from the time of manufacture through long-term use despite immersion. For example, two identical transducers with the same acoustic focus should be interchangeable and generate droplets of the same size when used in droplet transfer applications even if one is used 5 years (left dry outside the instrument) while the other one was immersed for 5 years. Comparable consistency can be expected for long-term use in other immersed applications also, such as NDT.

Figure 25:
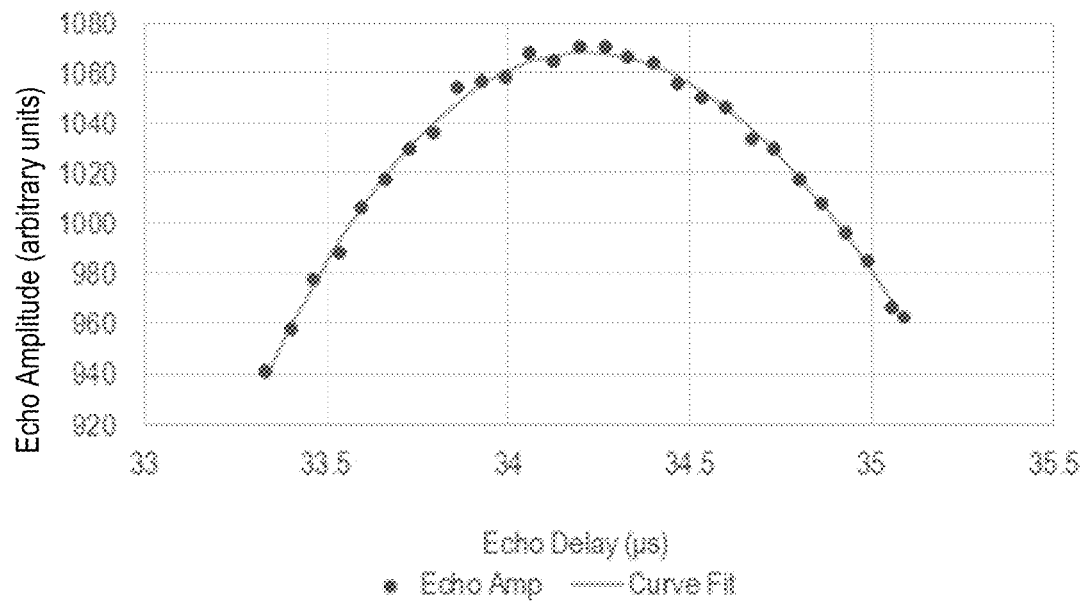
FIG. 25 is a chart illustrating the echo amplitude as a function of echo delay of a fluid impermeable transducer for estimating the characteristic time-of-flight (ToF) that corresponds to the focal length of the transducer.
Figure 26:
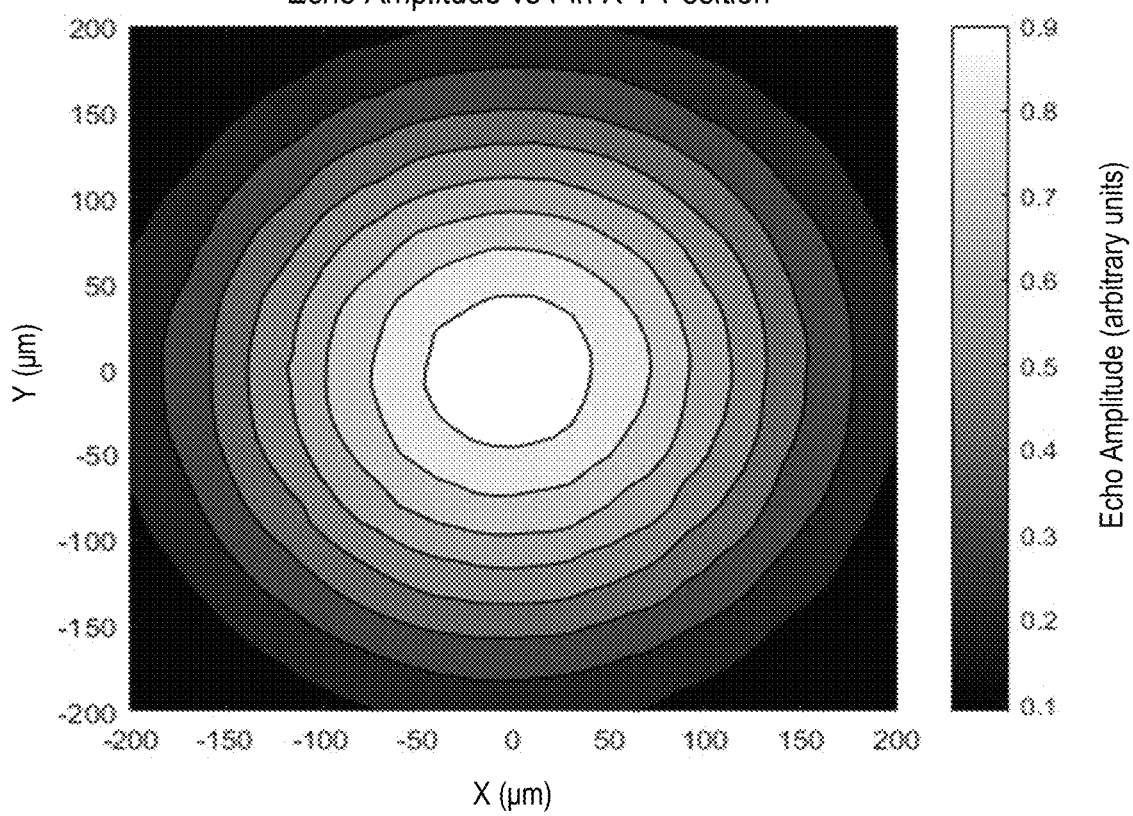
FIG. 26 is a contour plot showing the echo amplitude across the focal plane of a fluid impermeable transducer for estimating acoustic beam shape and symmetry at the focal plane.

Consistency of performance in fluid impermeable transducers may be characterized in several ways, including but not limited to consistent focal length, eccentricity, and symmetry. Focal length can be determined empirically by measuring the amplitude of an acoustic beam along an axis through the apex of the lens. FIG. 25 is a chart showing an exemplary focal sweep along this axis, showing the echo amplitude as a function of the echo delay, or time-of-flight (ToF) corresponding to distance from the lens. Similarly, the shape of the focus (e.g., eccentricity, symmetry) can be determined empirically by measuring the amplitude of an acoustic beam across a two-dimensional plane corresponding to the focal length, i.e. the focal plane. FIG. 26 is a contour plot showing the echo amplitude measured across an exemplary focal plane of an acoustic beam generated by a fluid impermeable transducer.

The procedure for measuring focal length of a transducer is as follows. A flat, solid plate is mounted on a mechanical translation stage in front of the transducer such that the plate is perpendicular to the acoustic beam radiated from the transducer. The translation stage should be configured to move the plate such that the distance between the apex of the lens and the plate can be varied around the expected focal plane of the lens. The space between the transducer and plate is filled with a suitable coupling fluid, such as but not limited to distilled water, in a temperature-controlled environment. A flat, smooth plate of stainless can be used as the solid part. The transducer is positioned at a range of discrete spacing from the plate, and excited with short "ping" waveforms at each spacing. Each ping excites a short sound burst from the transducer traveling to the plate, which is reflected back towards the lens and converted back to electrical signals at the transducer. For each ping, the echo peak amplitude as well as the delay between the reflected echo and the applied ping signal are measured, and the process is repeated at each successive transducer-plate spacing. The respective echo peak amplitudes and delays can be plotted as shown in FIG. 25. The delay that gives the highest echo return is the characteristic time-of-flight (ToF) that corresponds to the focal length of the transducer. If needed, a curve fit could be employed to smooth out the inevitable noise in the received echoes to make a consistent estimate of the focus ToF. The fluid impermeable transducers disclosed herein can retains lens shape over long periods of immersion, thereby retaining consistent focal lengths even after long periods of immersion. According to some embodiments, fluid impermeable transducers as disclosed herein can generate an acoustic beam after a year of immersion having a focal length within 0.1% of an initial focal length of an initial acoustic beam generated immediately after initial immersion. This consistency can also extend to beam eccentricity and symmetry after long periods of immersion.

The procedure for measuring the spatial properties of an acoustic beam generated by a transducer, and thereby measuring its eccentricity and symmetry, is as follows. First, a sharp pin reflector is mounted on a set of x-y dual mechanical translation stages in front of the transducer such that the pin is aligned with the acoustic beam radiated from the transducer and the tip is at the focal plane of the lens. The translation stages should be configured to move the pin in the transverse direction around the expected focal point of the lens. The space between the transducer and pin is filled with a suitable coupling fluid, often distilled water, in a temperature-controlled environment. Once assembled, the translation stage is used to move the pin in a raster pattern with small x-y step increments while the transducer is used to emit and record an acoustic signal. At each x-y position, the following steps are performed: (a) the transducer is excited with a short "ping" waveform, (b) the ping excites a short sound burst from the transducer traveling to the plate, (c) the pin reflects the sound beam back towards the lens of the transducer, (d) the transducer signal converts the echoes back to electrical signals, and (e) the reflected echo peak amplitude of the reflected echo is recorded and associated with the respective x-y position. The recorded values of peak echo signal can be plotted against the x-y position as shown in the contour plot of FIG. 26. A surface fit can be used to estimate the eccentricity or concentricity of the acoustic beam emitted from the transducer.

The spatial properties of the acoustic beams generated by the fluid impermeable transducers disclosed herein are very consistent over time and after immersion, in contrast to transducers using materials that gradually take up, degrade, or deform in liquid. This consistency can be described in terms of symmetry, eccentricity, or concentricity, or other attribute. According to some embodiments, the eccentricity of an acoustic beam generated by a fluid impermeable transducer after immersion of the transducer in liquid for a year is consistent to within 0.1% of an initial eccentricity of an initial acoustic beam generated immediately after initial immersion. The fluid impermeable materials disclosed herein for the transducer lens, as well as the backing layers and actuators, can also provide for improved precision of the lens shape and resulting acoustic beam shape over previously available transducers. Accordingly, precise acoustic beam shapes with an eccentricity of less than 0.1% (i.e., perfectly concentric or nearly concentric), are achievable and can be retained over long periods of immersion.

In some alternative embodiments, water-impermeable transducers as described herein may be used in transducer arrays for specific applications (e.g., NDT and analytical applications, high-power applications, or the like). Conversely, water-impermeable transducers as described herein may also be used to replace transducer arrays in applications traditionally reserved for an array of transducers. Such transducer arrays are described in detail in, e.g., U.S. Pat. No. 8,544,976. Approaches known in the art can be used for determining physical parameters of scanned structures based on characteristics of the echo returned from such structures by a scanning operation. Various physical parameters and echo characteristics for NDT, as well as scanning parameters, are known in the art and are disclosed in the following references, which are hereby incorporated by reference for all purposes: V. M Ristic, "Principles of Acoustic Devices," John Wiley and Sons (1983); G. Crowe, "An Introduction to Nondestructive Testing," (2009), www.ndt.org/; and asnt.org/Home.

Various computational methods discussed above may be performed in conjunction with or using a computer or other processor having hardware, software, and/or firmware. The various method steps may be performed by modules, and the modules may comprise any of a wide variety of digital and/or analog data processing hardware and/or software arranged to perform the method steps described herein. The modules optionally comprising data processing hardware adapted to perform one or more of these steps by having appropriate machine programming code associated therewith, the modules for two or more steps (or portions of two or more steps) being integrated into a single processor board or separated into different processor boards in any of a wide variety of integrated and/or distributed processing architectures. These methods and systems will often employ a tangible media embodying machine-readable code with instructions for performing the method steps described above. Suitable tangible media may comprise a memory (including a volatile memory and/or a non-volatile memory), a storage media (such as a magnetic recording on a floppy disk, a hard disk, a tape, or the like; on an optical memory such as a CD, a CD-R/W, a CD-ROM, a DVD, or the like; or any other digital or analog storage media), or the like.

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings and/or examples making apparent to those skilled in the art how the several forms of the invention may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary, 3rd Edition or a dictionary known to those of skill in the art, such as the Oxford Dictionary of Biochemistry and Molecular Biology (Ed. Anthony Smith, Oxford University Press, Oxford, 2004).

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to". Words using the singular or plural number also include the plural and singular number, respectively. Additionally, the words "herein," "above," and "below" and words of similar import, when used in this application, shall refer to this application as a whole and not to any particular portions of the application.

The description of embodiments of the disclosure is not intended to be exhaustive or to limit the disclosure to the precise form disclosed. While the specific embodiments of, and examples for, the disclosure are described herein for illustrative purposes, various equivalent modifications are possible within the scope of the disclosure, as those skilled in the relevant art will recognize.

All references, including patent filings (including patents, patent applications, and patent publications), scientific journals, books, treatises, technical references, and other publications and materials discussed in this application, are incorporated herein by reference in their entirety for all purposes.

Aspects of the disclosure can be modified, if necessary, to employ the systems, functions, and concepts of the above references and application to provide yet further embodiments of the disclosure. These and other changes can be made to the disclosure in light of the detailed description.

Specific elements of any foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

While the above provides a full and complete disclosure of exemplary embodiments of the present invention, various modifications, alternate constructions and equivalents may be employed as desired. Consequently, although the embodiments have been described in some detail, by way of example and for clarity of understanding, a variety of modifications, changes, and adaptations will be obvious to those of skill in the art. Accordingly, the above description and illustrations should not be construed as limiting the invention, which can be defined by the appended claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

In the following, further examples are described to facilitate understanding of the invention:

Example A. A transducer, comprising: a casing; a fluid impermeable transducer head comprising a metal focusing lens, the transducer head having a back surface and a front surface, the metal focusing lens being disposed on the front surface and configured to focus ultrasound towards a focal point; and an actuator bonded to the back surface of the transducer head and operable to generate oscillatory mechanical vibration of the metal focusing lens so that ultrasound is emitted from the metal focusing lens towards the focal point, wherein the casing and transducer head are connected in a fluid impermeable manner to prevent ingress of liquid into the casing.

Example B. The transducer of any of the preceding examples, wherein the casing comprises a metal casing connected to the metal focusing lens via a fluid impermeable joint.

Example C. The transducer of Example B, wherein the fluid impermeable joint comprises a welded joint.

Example D. The transducer of any of the preceding examples, wherein the casing and transducer head are connected in a fluid impermeable manner to prevent ingress of gas into the casing.

Example E. The transducer of any of the preceding examples, wherein the casing and the metal focusing lens are integrally formed.

Example F. The transducer of any of the preceding examples, wherein the focusing lens comprises a spherical concave surface.

Example G. The transducer of any of the preceding examples, wherein the focusing lens comprises a cylindrical concave surface.

Example H. The transducer of any of the preceding examples, wherein the actuator is a piezoelectric transducer.

Example I. The transducer of any of the preceding examples, wherein the front surface of the transducer head comprises a peripheral portion surrounding the focusing lens, and further comprising: an attenuation layer interfaced with the peripheral portion and configured to absorb ultrasonic energy emitted through the peripheral portion from the actuator.

Example J. The transducer of any of the preceding examples, further comprising a matching layer coupled to the focusing lens to transmit ultrasound from the focusing lens to a medium, the matching layer being configured to enhance transmission of ultrasound from the focusing lens to the medium as compared to direct transmission of ultrasound from the focusing lens to the medium.

Example K. The transducer of Example J, wherein the focusing lens has a first acoustic impedance, the medium has a second acoustic impedance different from the first acoustic impedance, and the matching layer has a matching acoustic impedance between the first and second acoustic impedances.

Example L. The transducer of Example K, wherein the matching acoustic impedance is approximately equal to $Z_m$ according to equation $Z_m=\sqrt{(Z_l Z_c)}$, where $Z_l$ is the first acoustic impedance and $Z_c$ is the second acoustic impedance.

Example M. The transducer of Example L, wherein the matching acoustic impedance is within 10% of $Z_m$.

Example N. The transducer of Example L, wherein the matching acoustic impedance is within 5% of $Z_m$.

Example O. The transducer of Example K, wherein the matching acoustic impedance is within a range of about 4-10 Mrayl.

Example P. The transducer of Example K, wherein the matching acoustic impedance is within a range of about 6-8 Mrayl.

Example Q. The transducer of any of Examples J-P, wherein the matching layer comprises graphite.

Example R. The transducer of any of Examples J-P, wherein the matching layer comprises a fluoropolymer layer.

Example S. The transducer of any of Examples J-P, wherein the matching layer comprises polyvinylidene difluoride.

Example T. The transducer of any of Examples J-S, wherein the matching layer has a thickness corresponding to an odd multiple of a quarter wavelength of an acoustic signal at a nominal frequency passing through the matching layer.

Example U. The transducer of claim T, wherein the thickness of the matching layer is within 20% of a nominal thickness defined by the odd multiple of the quarter wavelength.

Example V. The transducer of claim T, wherein the thickness of the matching layer is within 10% of a nominal thickness defined by the odd multiple of the quarter wavelength.

Example W. The transducer of any of Examples T-V, wherein the nominal frequency is in a range of 2 to 15 MHz.

Example X. The transducer of any of Examples T-W, wherein the matching layer has a thickness ranging from 30 to 80 μm.

Example Y. The transducer of any of the preceding examples, further comprising a first matching layer disposed on the front surface and a second matching layer disposed on the first matching layer, the first and second matching layers configured to enhance transmission of ultrasound from the focusing lens to a medium as compared to direct transmission of ultrasound from the focusing lens to the medium.

Example Z. The transducer of Example Y, wherein: the focusing lens has a first acoustic impedance; the medium has a second acoustic impedance different from the first acoustic impedance; the first matching layer has a first matching acoustic impedance between the first and second acoustic impedances; and the second matching layer has a second matching acoustic impedance between the first matching acoustic impedance and the second acoustic impedance.

Example AA. The transducer of claim Z, wherein the first and second matching acoustic impedances are approximately equal to $Z_{m1}$ and $Z_{m2}$, respectively, where $Z_{m1}=\sqrt{(Z_l Z_{m2})}$ and $Z_{m2}=\sqrt{(Z_{m1} Z_c)}$, and where $Z_l$ corresponds to the acoustic impedance of the metal; focusing lens and $Z_c$ corresponds to the acoustic impedance of the medium.

Example AB. The transducer of any of the preceding examples, wherein the focusing lens is larger in diameter than the actuator.

Example AC. The transducer of any of the preceding examples, wherein the transducer head is formed of metal or a metal alloy.

Example AD. The transducer of any of the preceding examples, where in the transducer head includes one or more of aluminum (Al), beryllium (Be), cadmium (Cd), carbon (C), chrome (Cr), copper (Cu), germanium (Ge), gold (Au), iron (Fe), lead (Pb), manganese (Mn), molybdenum (Mo), nickel (Ni), niobium (Nb), phosphorous (P), platinum (Pt), selenium (Se), silicon (Si), silver (Ag), tin (Sn), titanium (Ti), tungsten (W), vanadium (V), zinc (Zn), or zirconium (Zr).

Example AE. The transducer of any of the preceding examples, wherein the transducer head and casing are characterized by a liquid penetration depth and induced material loss of zero when immersed in liquid.

Example AF. The transducer of any of the preceding examples, wherein the transducer head and casing are characterized by a material weight loss of less than 0.1% per year of contact with liquid.

Example AG. The transducer of any of the preceding examples, wherein the actuator has a thickness equal to approximately half of a nominal acoustic wavelength of an acoustic signal at a nominal frequency generated by the transducer.

Example AH. The transducer of any of the preceding examples, wherein the actuator has a thickness equal to approximately 275 μm.

Example AI. The transducer of any of the preceding examples, further comprising a backing material configured to attenuate acoustic energy transmitted by the actuator, the actuator being positioned between the backing material and the metal focusing lens.

Example AJ. The transducer of Example AI, wherein the backing material comprises particles of an acoustic scattering material uniformly suspended in an acoustic damping material.

Example AK. The transducer of Example AI, wherein the backing material comprises a damping polymer matrix.

Example AL. The transducer of Example AI, wherein the backing material comprises a damping polymer matrix impregnated with particles of silicon carbide.

Example AM. The transducer of Example AI, wherein the backing material comprises a damping polymer matrix impregnated with particles of tungsten.

Example AN. The transducer of Example AI, wherein the backing material has acoustic impedance ranging from 13.5 to 16.5 Mrayl.

Example AO. The transducer of any of Examples AI-AN, further comprising a sealant substantially filling an interior space of the casing, the backing material being disposed between the actuator and the sealant.

Example AP. The transducer of any of the preceding examples, wherein a focal length of an acoustic beam generated by the transducer is sufficiently stable that the focal length changes at a rate of less than 0.1% per year of contact with liquid.

Example AQ. The transducer of any of the preceding examples, wherein an eccentricity of an acoustic beam generated by the transducer is sufficiently stable that the eccentricity changes at a rate of less than 0.1% per year of contact with liquid.

Example AR. The transducer of any of the preceding examples, wherein the transducer is fluid impermeable and resilient against changes in performance when exposed to temperatures in excess of 130° C. at more than 2 atmospheres of pressure.

Example AS. A method of forming a fluid impermeable ultrasonic transducer, the method comprising: forming a substantially hollow casing from a fluid impermeable material having an internal cavity and an open first end; forming a transducer head element from the fluid impermeable material, the transducer head element being sized to connect with the open first end of the casing; forming a focusing lens on a front surface of the head element, the focus lens configured to focus ultrasound towards a focal point; joining the head element with the first end of the casing to form a fluid impermeable joint, the head element positioned such that the focusing lens points away from the casing; and bonding an actuator to a back surface of the transducer head opposite the front surface, the actuator operable to generate oscillatory mechanical vibration of the focusing lens so that ultrasound is emitted from the focusing lens toward the focal point.

Example AT. The method of Example AS, wherein joining the head element with the first end of the casing comprises welding the head element with the casing.

Example AU. The method of any of the preceding examples, wherein forming the focusing lens comprises removing material from the front surface of the head element via a precision machining process.

Example AV. The method of any of the preceding examples, further comprising: inserting a backing material adjacent and behind the actuator in the casing; and substantially filling a remainder of the internal cavity of the casing with a sealant.

Example AW. The method of any of the preceding examples, further comprising: applying a matching layer to the focusing lens, the matching layer comprising a material having an matching acoustic impedance corresponding to $Z_m$, according to equation $Z_m = \sqrt{(Z_l Z_c)}$, where $Z_l$ is a first acoustic impedance corresponding to the head element and $Z_c$ is a second acoustic impedance corresponding to a medium.

Example AX. The method of Example AW, further comprising: reducing a thickness of the matching layer to conform the thickness to an odd multiple of a quarter wavelength of an acoustic signal at a nominal frequency passing through the matching layer.

Example AY. The method of Example AW, further comprising: applying the matching layer at a thickness corresponding to an odd multiple of a quarter wavelength of an acoustic signal at a nominal frequency passing through the matching layer.

Example AZ. The method of any of the preceding examples, further comprising: inserting a backing material adjacent and behind the actuator in the casing; inserting a conductive ring element into the casing abutting the actuator and around a periphery of the backing material, the conducting ring having an inner conductive portion and an outer conductive portion; contacting a first electrode of the actuator with the inner conductive portion of the conductive ring element; and contacting a second electrode of the actuator with the outer conductive portion of the conductive ring element.

Example BA. The method of any of the preceding examples, further comprising: applying an attenuation layer to a periphery of the head element adjacent to the focusing lens.

Example BB. The method of any of the preceding examples, further comprising: applying a matching layer to the focusing lens, the matching layer having a matching acoustic impedance that is less than a first acoustic impedance of the transducer head.

Example BC. A method of forming a fluid impermeable ultrasonic transducer, the method comprising: forming a substantially hollow casing from a fluid impermeable material having an internal cavity and a closed first end defining a transducer head element; forming a focusing lens on a front surface of the head element, the focus lens configured to focus ultrasound towards a focal point; bonding an actuator to a back surface of the transducer head opposite the front surface, the actuator operable to generate oscillatory mechanical vibration of the focusing lens so that ultrasound is emitted from the focusing lens toward the focal point.

Example BD. The method of Example BC, wherein forming the focusing lens comprises removing material from the front surface of the head element.

Example BE. The method of any of the preceding examples, further comprising: inserting a backing material adjacent and behind the actuator in the casing; and substantially filling a remainder of the internal cavity of the casing with a sealant.

Example BF. The method of Example BE, further comprising: inserting a conductive ring element into the casing abutting the actuator and around a periphery of the backing material, the conducting ring having an inner conductive portion and an outer conductive portion; contacting a first electrode of the actuator with the inner conductive portion of the conductive ring element; and contacting a second electrode of the actuator with the outer conductive portion of the conductive ring element.

Example BG. The method of any of the preceding examples, further comprising: applying a matching layer to the focusing lens, the matching layer comprising a material having a matching acoustic impedance corresponding to $Z_m$, according to equation $Z_m = \sqrt{(Z_l \, Z_c)}$, where $Z_l$ is a first acoustic impedance corresponding to the head element and $Z_c$ is a second acoustic impedance corresponding to a medium.

Example BH. The method of Example BG, further comprising: reducing a thickness of the matching layer to conform the thickness to an odd multiple of a quarter wavelength of an acoustic signal at a nominal frequency passing through the matching layer.

Example BI. The method of Example BG, further comprising: applying the matching layer at a thickness corresponding to an odd multiple of a quarter wavelength of an acoustic signal at a nominal frequency passing through the matching layer.

Example BJ. The method of any of the preceding examples, further comprising: applying an attenuation layer to a periphery of the head element adjacent to the focusing lens.

Example BK. The method of any of the preceding examples, further comprising: applying a matching layer to the focusing lens, the matching layer having a matching acoustic impedance that is less than a first acoustic impedance of the transducer head.

Example BL. A method of ejecting droplets from a reservoir of fluid, the method comprising: with a fluid impermeable transducer comprising the transducer of any of Examples A-AR; immersing the focusing lens in an acoustic medium positioned to couple acoustic energy from the transducer to the reservoir; generating an acoustic pulse by the actuator at a frequency configured to cause droplet ejection from a fluid surface of the reservoir; and passing the acoustic pulse from the actuator to the fluid reservoir via the focusing lens.

Example BM. A method of performing ultrasound testing of a structure, the method comprising: with a fluid impermeable transducer comprising the transducer of any of Examples A-AR; immersing the focusing lens in an acoustic medium in fluid contact with the structure; generating an acoustic pulse by the actuator and directed at a scanned region of the structure; receiving an echo of the acoustic pulse corresponding to the scanned region; and determining a physical parameter of the scanned region of the structure based on a characteristic of the echo.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

What is claimed is:

1. A fluid impermeable transducer, comprising:
a fluid impermeable metal casing;
a fluid impermeable transducer head comprising a metal focusing lens, wherein the fluid impermeable transducer head and the fluid impermeable metal casing comprise titanium, the fluid impermeable transducer head having a back surface and a front surface, the metal focusing lens being disposed on the front surface and configured to focus ultrasound towards a focal point; and
an actuator bonded to the back surface of the fluid impermeable transducer head and operable to generate oscillatory mechanical vibration of the metal focusing lens so that ultrasound is emitted from the metal focusing lens towards the focal point, wherein the fluid impermeable metal casing and the fluid impermeable transducer head are integrally formed as a single part and permanently connected in a fluid impermeable manner to prevent ingress of liquid into the fluid impermeable metal casing, wherein the front surface of the fluid impermeable transducer head comprises:
a peripheral portion surrounding the metal focusing lens; and
an attenuation layer interfaced with the peripheral portion and configured to absorb ultrasonic energy emitted through the peripheral portion from the actuator.

2. The fluid impermeable transducer of claim 1, wherein the fluid impermeable metal casing and the fluid impermeable transducer head are connected in a fluid impermeable manner to prevent ingress of gas into the fluid impermeable metal casing.

3. The fluid impermeable transducer of claim 1, wherein the metal focusing lens comprises a spherical concave surface.

4. The fluid impermeable transducer of claim 1, wherein the metal focusing lens comprises a cylindrical concave surface.

5. The fluid impermeable transducer of claim 1, wherein the actuator is a piezoelectric transducer.

6. The fluid impermeable transducer of claim 1, further comprising a matching layer coupled to the metal focusing lens to transmit ultrasound from the metal focusing lens to a medium, the matching layer being configured to enhance transmission of ultrasound from the metal focusing lens to the medium as compared to direct transmission of ultrasound from the metal focusing lens to the medium.

7. The fluid impermeable transducer of claim 6, wherein the metal focusing lens has a first acoustic impedance, the medium has a second acoustic impedance different from the first acoustic impedance, and the matching layer has a matching acoustic impedance between the first and second acoustic impedances.

8. The fluid impermeable transducer of claim 7, wherein the matching acoustic impedance is approximately equal to $Z_m$ according to equation $Z_m = \sqrt{Z_l Z_c}$, where $Z_l$ is the first acoustic impedance and $Z_c$ is the second acoustic impedance.

9. The fluid impermeable transducer of claim 8, wherein the matching acoustic impedance is within 10% of Zm.

10. The fluid impermeable transducer of claim 8, wherein the matching acoustic impedance is within 5% of Zm.

11. The fluid impermeable transducer of claim 7, wherein the matching acoustic impedance is within a range of about 4-10 Mrayl.

12. The fluid impermeable transducer of claim 7, wherein the matching acoustic impedance is within a range of about 6-8 Mrayl.

13. The fluid impermeable transducer of claim 7, wherein the matching layer comprises graphite.

14. The fluid impermeable transducer of claim 7, wherein the matching layer comprises a fluoropolymer layer.

15. The fluid impermeable transducer of claim 7, wherein the matching layer comprises polyvinylidene difluoride.

16. The fluid impermeable transducer of claim 6, wherein the matching layer has a thickness corresponding to an odd multiple of a quarter wavelength of an acoustic signal at a nominal frequency passing through the matching layer.

17. The fluid impermeable transducer of claim 16, wherein the thickness of the matching layer is within 20% of a nominal thickness defined by the odd multiple of the quarter wavelength.

18. The fluid impermeable transducer of claim 16, wherein the thickness of the matching layer is within 10% of a nominal thickness defined by the odd multiple of the quarter wavelength.

19. The fluid impermeable transducer of claim 16, wherein the nominal frequency is in a range of 2 to 15 MHz.

20. The fluid impermeable transducer of claim 6, wherein the matching layer has a thickness ranging from 30 to 80 μm.

21. The fluid impermeable transducer of claim 1, further comprising a first matching layer disposed on the front surface and a second matching layer disposed on the first matching layer, the first and second matching layers configured to enhance transmission of ultrasound from the metal focusing lens to a medium as compared to direct transmission of ultrasound from the metal focusing lens to the medium.

22. The fluid impermeable transducer of claim 21, wherein:
the metal focusing lens has a first acoustic impedance;
the medium has a second acoustic impedance different from the first acoustic impedance;
the first matching layer has a first matching acoustic impedance between the first and second acoustic impedances; and
the second matching layer has a second matching acoustic impedance between the first matching acoustic impedance and the second acoustic impedance.

23. The fluid impermeable transducer of claim 22, wherein the first and second matching acoustic impedances are approximately equal to $Z_{m1}$ and $Z_{m2}$, respectively, where $Z_{m1} = \sqrt[3]{Z_l Z_{m2}}$ and $Z_{m2} = \sqrt[3]{Z_{m1} Z_c}$, and where $Z_l$ corresponds to the acoustic impedance of the metal; focusing lens and $Z_c$ corresponds to the acoustic impedance of the medium.

24. The fluid impermeable transducer of claim 1, wherein the metal focusing lens is larger in diameter than the actuator.

25. The fluid impermeable transducer of claim 1, wherein the fluid impermeable transducer head is formed of metal or a metal alloy.

26. The fluid impermeable transducer of claim 1, where in the fluid impermeable transducer head includes one or more of aluminum (Al), beryllium (Be), cadmium (Cd), carbon (C), chrome (Cr), copper (Cu), germanium (Ge), gold (Au), iron (Fe), lead (Pb), manganese (Mn), molybdenum (Mo), nickel (Ni), niobium (Nb), phosphorous (P), platinum (Pt), selenium (Se), silicon (Si), silver (Ag), tin (Sn), titanium (Ti), tungsten (W), vanadium (V), zinc (Zn), or zirconium (Zr).

27. The fluid impermeable transducer of claim 1, wherein the fluid impermeable transducer head and the fluid impermeable metal casing are characterized by a liquid penetration depth and induced material loss of zero when immersed in liquid.

28. The fluid impermeable transducer of claim 1, wherein the fluid impermeable transducer head and the fluid impermeable metal casing are characterized by a material weight loss of less than 0.1% per year of contact with liquid.

29. The fluid impermeable transducer of claim 1, wherein the actuator has a thickness equal to approximately half of a nominal acoustic wavelength of an acoustic signal at a nominal frequency generated by the transducer.

30. The fluid impermeable transducer of claim 1, wherein the actuator has a thickness equal to approximately 275 μm.

31. The fluid impermeable transducer of claim 1, further comprising a backing material configured to attenuate acoustic energy transmitted by the actuator, the actuator being positioned between the backing material and the metal focusing lens.

32. The fluid impermeable transducer of claim 31, wherein the backing material comprises particles of an acoustic scattering material uniformly suspended in an acoustic damping material.

33. The fluid impermeable transducer of claim 31, wherein the backing material comprises a damping polymer matrix.

34. The fluid impermeable transducer of claim 31, wherein the backing material comprises a damping polymer matrix impregnated with particles of silicon carbide.

35. The fluid impermeable transducer of claim 31, wherein the backing material comprises a damping polymer matrix impregnated with particles of tungsten.

36. The fluid impermeable transducer of claim 31, wherein the backing material has acoustic impedance ranging from 13.5 to 16.5 Mrayl.

37. The fluid impermeable transducer of claim 31, further comprising a sealant substantially filling an interior space of the fluid impermeable metal casing, the backing material being disposed between the actuator and the sealant.

38. The fluid impermeable transducer of claim 1, wherein a focal length of an acoustic beam generated by the transducer is sufficiently stable that the focal length changes at a rate of less than 0.1% per year of contact with liquid.

39. The fluid impermeable transducer of claim 1, wherein an eccentricity of an acoustic beam generated by the transducer is sufficiently stable that the eccentricity changes at a rate of less than 0.1% per year of contact with liquid.

40. The fluid impermeable transducer of claim 1, wherein the transducer is fluid impermeable and resilient against changes in performance when exposed to temperatures in excess of 130° C. at more than 2 atmospheres.

41. A method of forming a fluid impermeable ultrasonic transducer, the method comprising:
   forming a substantially hollow casing from a fluid impermeable material having an internal cavity and an open first end, wherein the fluid impermeable material comprises titanium;
   forming a transducer head element from the fluid impermeable material, the transducer head element being sized to connect with the open first end of the casing;
   forming a focusing lens on a front surface of the transducer head element, the focus lens configured to focus ultrasound towards a focal point;
   joining the head element with the first end of the casing to form a fluid impermeable joint, the head element positioned such that the focusing lens points away from the casing;
   bonding an actuator to a back surface of the transducer head element opposite the front surface, the actuator operable to generate oscillatory mechanical vibration of the focusing lens so that ultrasound is emitted from the focusing lens toward the focal point;
   forming a peripheral portion surrounding the focusing lens; and
   forming an attenuation layer interfaced with the peripheral portion, the attenuation layer configured to absorb ultrasonic energy emitted through the peripheral portion from the actuator, wherein the front surface of the transducer head comprises the peripheral portion and the attenuation layer.

42. The method of claim 41, wherein joining the head element with the first end of the casing comprises welding the head element with the casing.

43. The method of claim 41, wherein forming the focusing lens comprises removing material from the front surface of the head element via a precision machining process.

44. The method of claim 41, further comprising:
   inserting a backing material adjacent and behind the actuator in the casing; and
   substantially filling a remainder of the internal cavity of the casing with a sealant.

45. The method of claim 41, further comprising:
   applying a matching layer to the focusing lens, the matching layer comprising a material having an matching acoustic impedance corresponding to $Z_m$, according to equation $Z_m = \sqrt{\sqrt{Z_l Z_c}}$, where $Z_l$ is a first acoustic impedance corresponding to the head element and $Z_c$ is a second acoustic impedance corresponding to a medium.

46. The method of claim 45, further comprising:
   reducing a thickness of the matching layer to conform the thickness to an odd multiple of a quarter wavelength of an acoustic signal at a nominal frequency passing through the matching layer.

47. The method of claim 45, further comprising:
   applying the matching layer at a thickness corresponding to an odd multiple of a quarter wavelength of an acoustic signal at a nominal frequency passing through the matching layer.

48. The method of claim 41, further comprising:
   inserting a backing material adjacent and behind the actuator in the casing; and
   inserting a conductive ring element into the casing abutting the actuator and around a periphery of the backing material, the conductive ring element having an inner conductive portion and an outer conductive portion;
   contacting a first electrode of the actuator with the inner conductive portion of the conductive ring element; and
   contacting a second electrode of the actuator with the outer conductive portion of the conductive ring element.

49. The method of claim 41, further comprising:
   applying a matching layer to the focusing lens, the matching layer having a matching acoustic impedance that is less than a first acoustic impedance of the transducer head element.

50. A method of forming a fluid impermeable ultrasonic transducer, the method comprising:
   forming a substantially hollow casing from a fluid impermeable material having an internal cavity and a closed first end defining a transducer head element, wherein the fluid impermeable material comprises titanium;
   forming a focusing lens on a front surface of the head element, the focus lens configured to focus ultrasound towards a focal point;
   bonding an actuator to a back surface of the transducer head element opposite the front surface, the actuator operable to generate oscillatory mechanical vibration of the focusing lens so that ultrasound is emitted from the focusing lens toward the focal point;
   forming a peripheral portion surrounding the focusing lens; and
   forming an attenuation layer interfaced with the peripheral portion, the attenuation layer configured to absorb ultrasonic energy emitted through the peripheral portion from the actuator, wherein the front surface of the head element comprises the peripheral portion and the attenuation layer.

51. The method of claim 50, wherein forming the focusing lens comprises removing material from the front surface of the head element.

52. The method of claim 50, further comprising:
   inserting a backing material adjacent and behind the actuator in the casing; and
   substantially filling a remainder of the internal cavity of the casing with a sealant.

53. The method of claim 52, further comprising:
   inserting a conductive ring element into the casing abutting the actuator and around a periphery of the backing material, the conductive ring element having an inner conductive portion and an outer conductive portion;
   contacting a first electrode of the actuator with the inner conductive portion of the conductive ring element; and
   contacting a second electrode of the actuator with the outer conductive portion of the conductive ring element.

54. The method of claim 50, further comprising:
   applying a matching layer to the focusing lens, the matching layer comprising a material having a matching acoustic impedance corresponding to $Z_m$, according to equation $Z_m = \sqrt{\sqrt{Z_l Z_c}}$, where $Z_l$ is a first acoustic impedance corresponding to the head element and $Z_c$ is a second acoustic impedance corresponding to a medium.

55. The method of claim 54, further comprising:
   reducing a thickness of the matching layer to conform the thickness to an odd multiple of a quarter wavelength of an acoustic signal at a nominal frequency passing through the matching layer.

56. The method of claim 54, further comprising:
applying the matching layer at a thickness corresponding to an odd multiple of a quarter wavelength of an acoustic signal at a nominal frequency passing through the matching layer.

57. The method of claim 50, further comprising:
applying a matching layer to the focusing lens, the matching layer having a matching acoustic impedance that is less than a first acoustic impedance of the transducer head element.

58. A method of ejecting droplets from a reservoir of fluid, the method comprising:
with a fluid impermeable transducer comprising:
a casing;
a fluid impermeable transducer head comprising a metal focusing lens, wherein the fluid impermeable transducer head and the casing comprise titanium, the fluid impermeable transducer head having a back surface and a front surface, the metal focusing lens being disposed on the front surface and configured to focus ultrasound towards a focal point; and
an actuator bonded to the back surface of the fluid impermeable transducer head and operable to generate oscillatory mechanical vibration of the metal focusing lens so that ultrasound is emitted from the metal focusing lens towards the focal point, wherein the casing and fluid impermeable transducer head are connected in a fluid impermeable manner to prevent ingress of liquid into the casing, wherein the front surface of the fluid impermeable transducer head comprises:
a peripheral portion surrounding the metal focusing lens; and
an attenuation layer interfaced with the peripheral portion and configured to absorb ultrasonic energy emitted through the peripheral portion from the actuator;
immersing the metal focusing lens in an acoustic medium positioned to couple acoustic energy from the fluid impermeable transducer to the reservoir;
generating an acoustic pulse by the actuator at a frequency configured to cause droplet ejection from a fluid surface of the reservoir; and
passing the acoustic pulse from the actuator to the reservoir via the metal focusing lens.

59. A method of performing ultrasound testing of a structure, the method comprising:
with a fluid impermeable transducer comprising:
a casing;
a fluid impermeable transducer head comprising a metal focusing lens, wherein the fluid impermeable transducer head and the casing comprise titanium, the fluid impermeable transducer head having a back surface and a front surface, the metal focusing lens being disposed on the front surface and configured to focus ultrasound towards a focal point; and
an actuator bonded to the back surface of the fluid impermeable transducer head and operable to generate oscillatory mechanical vibration of the metal focusing lens so that ultrasound is emitted from the metal focusing lens towards the focal point, wherein the casing and fluid impermeable transducer head are connected in a fluid impermeable manner to prevent ingress of liquid into the casing, wherein the front surface of the fluid impermeable transducer head comprises:
a peripheral portion surrounding the metal focusing lens; and
an attenuation layer interfaced with the peripheral portion and configured to absorb ultrasonic energy emitted through the peripheral portion from the actuator;
immersing the metal focusing lens in an acoustic medium in fluid contact with the structure;
generating an acoustic pulse by the actuator and directed at a scanned region of the structure;
receiving an echo of the acoustic pulse corresponding to the scanned region; and
determining a physical parameter of the scanned region of the structure based on a characteristic of the echo.

\* \* \* \* \*